United States Patent
Baranowski

(10) Patent No.: US 7,128,204 B2
(45) Date of Patent: *Oct. 31, 2006

(54) DISPENSERS AND METHODS OF DISPENSING ITEMS

(75) Inventor: John Baranowski, Bensalem, PA (US)

(73) Assignee: Campbell Soup Company, Camden, NJ (US)

( * ) Notice: Subject to any disclaimer, the term of this patent is extended or adjusted under 35 U.S.C. 154(b) by 183 days.

This patent is subject to a terminal disclaimer.

(21) Appl. No.: 10/743,425

(22) Filed: Dec. 23, 2003

(65) Prior Publication Data

US 2004/0134758 A1    Jul. 15, 2004

Related U.S. Application Data

(63) Continuation-in-part of application No. 10/601,669, filed on Jun. 24, 2003.

(60) Provisional application No. 60/390,365, filed on Jun. 24, 2002, provisional application No. 60/454,604, filed on Mar. 17, 2003.

(51) Int. Cl.
B65G 27/00    (2006.01)

(52) U.S. Cl. .................. 198/752.1; 198/757; 221/201; 222/161

(58) Field of Classification Search ............ 198/452.1, 198/757, 450, 441, 752.1, 391; 221/201–204; 222/161; 209/592, 920; 700/240; 177/25.18
See application file for complete search history.

(56) References Cited

U.S. PATENT DOCUMENTS

| | | |
|---|---|---|
| 3,578,094 A | 5/1971 | Henry et al. |
| 3,631,903 A | 1/1972 | Huggins |
| 3,696,584 A | 10/1972 | Rickard |
| 3,771,574 A | 11/1973 | Creed et al. |
| 3,782,878 A * | 1/1974 | Hudson ............ 425/314 |
| 3,796,351 A | 3/1974 | Kohl et al. |
| 3,822,032 A | 7/1974 | Vergobbi |
| 3,828,869 A | 8/1974 | Sellers |
| 3,877,205 A | 4/1975 | Gundersen |
| 3,938,601 A | 2/1976 | Hobart |
| 4,004,620 A | 1/1977 | Rosen |
| 4,053,003 A | 10/1977 | Ferrero et al. |
| 4,122,876 A | 10/1978 | Nalbach |
| 4,191,294 A | 3/1980 | McGrath et al. |
| 4,192,359 A | 3/1980 | Pippin |
| 4,193,465 A | 3/1980 | Henry |
| 4,248,027 A | 2/1981 | Cleary et al. |

(Continued)

FOREIGN PATENT DOCUMENTS

DE    900795    1/1954

(Continued)

OTHER PUBLICATIONS

Barry Graham and Paula Madden, Precision Feeding For Coating and Plating Processes, Fastener Technology International (Jun. 2000).

(Continued)

Primary Examiner—Gene O. Crawford
Assistant Examiner—Rashmi Sharma
(74) Attorney, Agent, or Firm—Baker Botts L.L.P.

(57) ABSTRACT

A dispenser includes a feeder bowl for receiving items to be dispensed, and a first vibration device for vibrating the feeder bowl. the dispenser also includes a plurality of dispensing paths positioned around the feeder bowl, and a rotation drive for rotating the dispensing paths. Moreover, the dispensing paths include a second vibration device for vibrating the dispensing paths proportionately to a physical characteristic of each of the items, such that the dispensing paths dispense the items singularly.

16 Claims, 15 Drawing Sheets

U.S. PATENT DOCUMENTS

| | | | | |
|---|---|---|---|---|
| 4,385,670 A | | 5/1983 | Braun et al. | |
| 4,398,612 A | * | 8/1983 | Mikami et al. | 177/25.18 |
| 4,431,070 A | | 2/1984 | Andrews | |
| 4,456,117 A | | 6/1984 | Szczepanski | |
| 4,516,644 A | * | 5/1985 | Fukuda | 177/25.18 |
| 4,527,647 A | | 7/1985 | Ueda | |
| 4,534,428 A | | 8/1985 | Mosher et al. | |
| 4,534,429 A | | 8/1985 | Konishi | |
| 4,540,082 A | | 9/1985 | Maddocks | |
| 4,548,287 A | | 10/1985 | Matsuura | |
| 4,552,236 A | | 11/1985 | Mikami | |
| 4,553,616 A | | 11/1985 | Haze | |
| 4,561,510 A | * | 12/1985 | Sugioka et al. | 177/84 |
| 4,570,419 A | | 2/1986 | Tinsley | |
| 4,576,209 A | | 3/1986 | Eisenberg | |
| 4,595,125 A | | 6/1986 | Alwerud | |
| 4,657,054 A | | 4/1987 | Schaltegger | |
| 4,687,672 A | | 8/1987 | Vitkovsky | |
| 4,708,215 A | | 11/1987 | Nakamura et al. | |
| 4,719,739 A | | 1/1988 | Foldesi | |
| 4,721,173 A | | 1/1988 | Hirota et al. | |
| 4,723,614 A | | 2/1988 | Lahti | |
| 4,733,520 A | | 3/1988 | Rabbi | |
| 4,753,275 A | | 6/1988 | Schaltegger | |
| 4,784,275 A | | 11/1988 | Fridge | |
| 4,844,190 A | * | 7/1989 | Mikami et al. | 177/25.18 |
| 4,931,122 A | | 6/1990 | Mitchell | |
| 4,999,977 A | | 3/1991 | Briscoe et al. | |
| 5,081,822 A | | 1/1992 | Boyd et al. | |
| 5,104,002 A | | 4/1992 | Cahlander et al. | |
| 5,108,012 A | | 4/1992 | Rosso | |
| 5,195,294 A | | 3/1993 | Baranowski | |
| 5,195,298 A | | 3/1993 | Baranowski | |
| 5,246,118 A | | 9/1993 | Mosher | |
| 5,313,508 A | | 5/1994 | Ditman et al. | |
| 5,336,032 A | * | 8/1994 | Pipes | 414/331.05 |
| 5,355,991 A | | 10/1994 | Baranowski | |
| 5,407,057 A | | 4/1995 | Baranowski | |
| 5,415,321 A | | 5/1995 | Gehlert et al. | |
| 5,454,016 A | | 9/1995 | Holmes | |
| 5,454,465 A | | 10/1995 | Baranowski | |
| 5,456,931 A | | 10/1995 | Egger et al. | |
| 5,458,055 A | | 10/1995 | Fitch, Jr. | |
| 5,522,512 A | | 6/1996 | Archer et al. | |
| 5,613,590 A | * | 3/1997 | Simionato | 198/358 |
| 5,638,417 A | | 6/1997 | Boyer et al. | |
| 5,638,657 A | | 6/1997 | Archer et al. | |
| 5,692,594 A | | 12/1997 | Sidler | |
| 5,726,394 A | | 3/1998 | Krämer sen. et al. | |
| 5,756,939 A | | 5/1998 | Taniguchi | |
| 5,762,113 A | | 6/1998 | Ricossa et al. | |
| 5,765,655 A | | 6/1998 | Tatsuoka | |
| 5,767,455 A | | 6/1998 | Mosher | |
| 5,804,772 A | | 9/1998 | Wooldridge et al. | |
| 5,829,493 A | | 11/1998 | Baranowski | |
| 5,878,865 A | | 3/1999 | Bailey et al. | |
| 5,938,074 A | | 8/1999 | Dartus | |
| 5,942,732 A | | 8/1999 | Holmes | |
| 6,098,785 A | | 8/2000 | Van Maanen | |
| 6,268,571 B1 | | 7/2001 | Benyukhis | |
| 6,273,238 B1 | | 8/2001 | Wooldridge | |
| 6,318,594 B1 | | 11/2001 | Hutchins | |
| 6,338,371 B1 | | 1/2002 | Araki et al. | |
| 6,351,676 B1 | | 2/2002 | Thomas et al. | |
| 6,360,870 B1 | | 3/2002 | Wooldridge | |
| 6,421,982 B1 | | 7/2002 | Eichenberger | |
| 6,431,407 B1 | | 8/2002 | Hogan et al. | |
| 6,772,806 B1 | | 8/2004 | De Villele | |
| 2002/0134050 A1 | | 9/2002 | Thieman | 53/412 |
| 2002/0139589 A1 | | 10/2002 | Matsuyama et al. | |
| 2004/0007438 A1 | | 1/2004 | Baranowski | 198/459.2 |
| 2004/0007444 A1 | | 1/2004 | Baranowski | 198/757 |
| 2004/0007584 A1 | | 1/2004 | Baranowski | 221/200 |
| 2004/0016765 A1 | | 1/2004 | Baranowski | 221/168 |

FOREIGN PATENT DOCUMENTS

| | | |
|---|---|---|
| EP | 0195428 | 9/1986 |
| EP | 0678738 | 10/1995 |
| WO | 9919215 | 4/1999 |
| WO | 0020306 | 4/2000 |
| WO | 0138202 | 5/2001 |
| WO | 02077582 | 10/2002 |

OTHER PUBLICATIONS

Donald Wooldridge, New Packaging Line For Fastener Kits, Fastener Technology International (Dec. 1997).

Gina Donliu, RTA Hardware Gains Precision Packaging, Furniture Design and Manufacturing (Dec. 1994).

Batching Systems Inc., Labor Savings Drive Auto Parts vf/f/s Bagging, Packaging Digest (Oct. 1996).

Batching Systems Inc., Batching Systems Kit Packaging Systems, Brochure (Feb. 1998).

Batching Systems Inc., Bagmaster® T Series Baggers, Brochure (May 2000).

Batching Systems Inc., Aucillary Equipment, Brochure (Feb. 1998).

Batching Systems Inc., Batchmaster® FAW (Fast Automatic Weigher), Brochure (Dec. 1999).

FMC Technologies, Syntron® Material Handling Solutions, Rotary Bowl Feeders, (at least as early as Apr. 2002).

FMC Technologies, Syntron® Material Handling Solutions, Electromagnetic Vibrating Feeders (Light Duty) (at least as early as Jan. 2004).

NTI Ltd., LinMot® Linear Servo Motors, (Jun. 2001).

Quicksilver Controls, Inc., SilverMax™ Fully Integrated Servomotors, Dec. 2001.

Batching Systems Inc., Batch 'n Clamshell Packaging Systems, Brochure (Jul. 2000).

Batching Systems, Inc., Bagmaster® C Series Baggers—Centerfold Web Style Machine, Brochure (Feb. 1998).

Batching Systems, Inc., Bagmaster® F Series Bagger—Flat Web Style Machine, Brochure (Feb. 1998).

Batching Systems, Inc., Batchmaster® Ultra, Brochure (Feb. 1998).

Batching Systems, Inc., Batchmaster® Counters, Brochure (Dec. 1999).

* cited by examiner

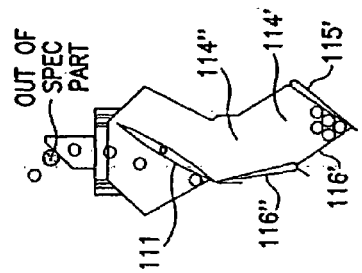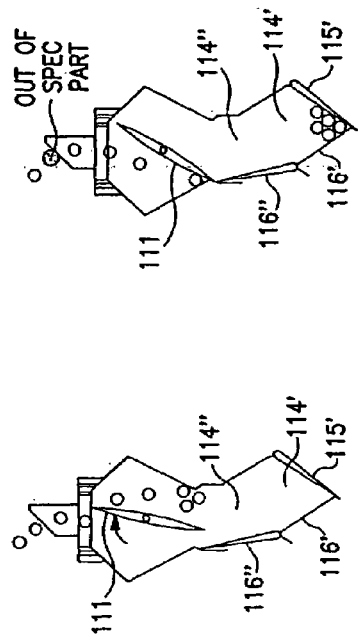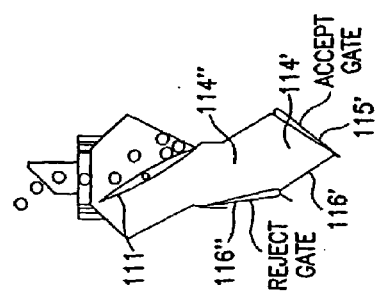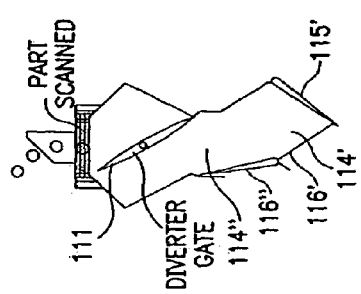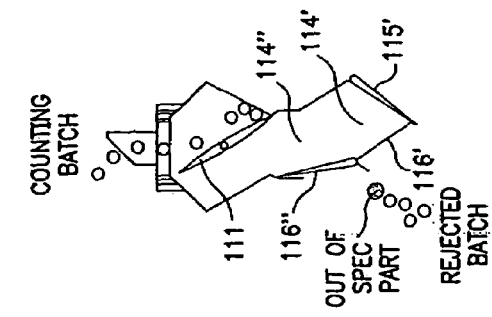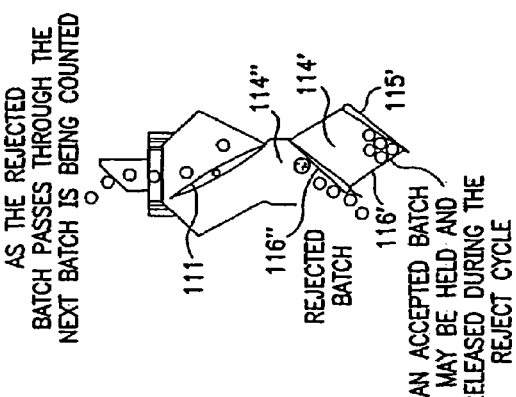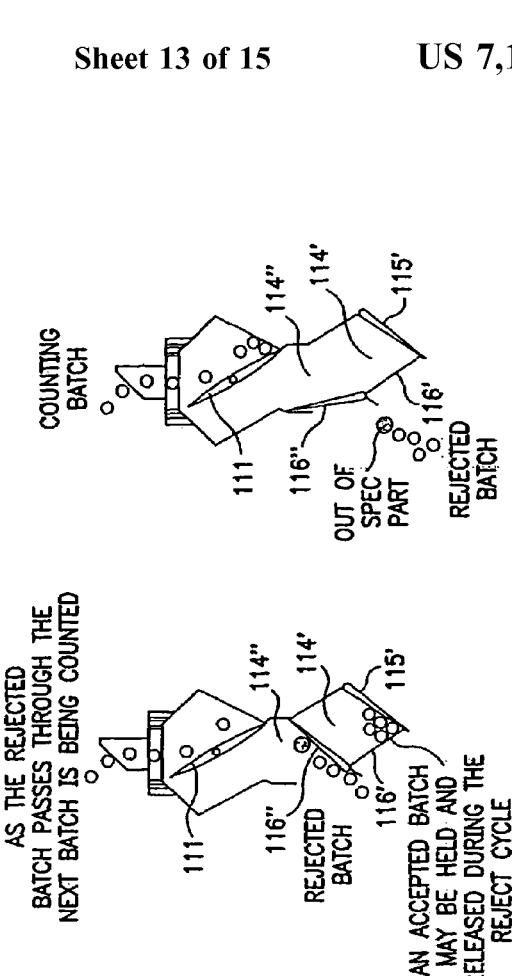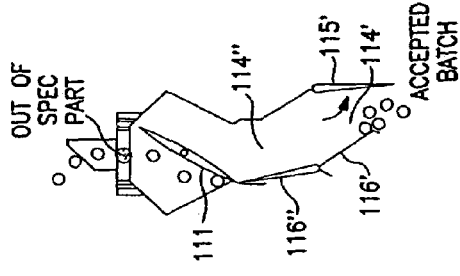

DISPENSERS AND METHODS OF DISPENSING ITEMS

This application claims priority from U.S. patent application Ser. No. 10/601,669 entitled "Dispensers and Methods of Dispensing Items," which was filed on Jun. 24, 2003, and claims priority from U.S. Provisional Patent Application No. 60/390,365 entitled "Rotary, Vibratory Dispensers and Methods of Dispensing Items," and filed on Jun. 24, 2002, and U.S. Provisional Patent Application No. 60/454,604 entitled "Dispensers and Methods of Dispensing Items," and filed on Mar. 17, 2003, the disclosures of which are incorporated herein by reference in their entirety.

BACKGROUND OF THE INVENTION

1. Field of the Invention

The present invention relates generally to dispensers and to methods of dispensing items. In particular, the present invention relates to vibratory dispensers and methods of dispensing items therefrom.

2. Description of Related Art

Known dispensers may receive and dispense a plurality of items. For example, known dispensers may receive a plurality of items on an item-receiving surface, supply the items to one or more dispensing paths positioned around the item-receiving surface, and dispense the items from the one or more dispensing paths. As disclosed in patent No. U.S. Pat. No. 6,360,870 B1, known dispensers may include vibration units that vibrate an item-receiving surface and a plurality of dispensing paths, so that a plurality of items may be received and dispensed from each of the dispensing paths. Known dispensers may count the dispensed items, so that predetermined quantities of items may be dispensed. In known dispensers, however, the accuracy of the count of dispensed items may be affected by the ability of known dispensers to dispense items singularly, e.g., in a single file, so that each item may be counted accurately. For example, if two or more items are dispensed simultaneously, known systems may count the items as a single item, thereby undermining the accuracy of the count of dispensed items.

SUMMARY OF THE INVENTION

A need has arisen for dispensers and methods of dispensing items that may receive and dispense a plurality of items, while accurately counting each dispensed item. In particular, a need has arisen for dispensers that dispense items singularly, so that items may be counted accurately. A further need has arisen for dispensers that measure a physical characteristic of each singularly-dispensed item and identify items, the measured physical characteristic of which is less than a predetermined range of physical characteristics. Yet a further need has arisen for dispensers and methods of dispensing items at faster rates than known dispensers while maintaining an accurate count of dispensed items.

A dispenser of the present invention may be used to dispense predetermined quantities of a variety of food items, e.g., dried food items, frozen food items, thawed food items, or the like. For example, such a dispenser may dispense dried food items, such as dried pasta, dehydrated vegetables, or the like. Moreover, a dispenser according to the present invention may be used to dispense frozen food items, e.g., frozen meat, frozen vegetables, or the like. The dispenser of the present invention may dispense items of varying physical characteristic, e.g., weight, volume, density, temperature, or the like, including non-food items. For example, the dispenser of the present invention may dispense fasteners, hardware, medical items, electronic parts, mechanical parts, metallic and non-metallic items, or the like.

According to an embodiment of the present invention, a rotary, vibratory dispenser comprises a feeder bowl, a first vibration device, a rotation drive, and a plurality of dispensing paths. The feeder bowl receives a plurality of items to be dispensed. The first vibration device vibrates the feeder bowl. The rotation drive rotates the feeder bowl. A plurality of dispensing paths are positioned around the feeder bowl. The dispensing paths rotate with the feeder bowl and comprise at least one second vibration device for vibrating the dispensing paths proportionately to a physical characteristic of the items, so that the dispensing paths dispense the items singularly. The second vibration device may vibrate each of the dispensing paths in a first plane and a second plane at different vibrational frequencies and vibrational magnitudes that are proportionate to a physical characteristic, such as a density, a volume, a weight, a shape, or a temperature, of each item to be dispensed. Moreover, a sensing unit may be positioned at an end of each dispensing path to measure a physical characteristic of each dispensed item. A dispensing head may be positioned at an end of each dispensing path to receive items dispensed from each dispensing path and to direct predetermined quantities of items to a container.

In another embodiment of the present invention, a method of dispensing items from a rotary, vibratory dispenser is disclosed. The method comprises the steps of delivering items onto a feeder bowl. The feeder bowl is rotated and vibrated, such that the items are supplied uniformly from the feeder bowl to a plurality of dispensing paths positioned around the feeder bowl. The dispensing paths are rotated and vibrated, so that the items are dispensed singularly from the dispensing paths. For example, the dispensing paths may be vibrated in a first plane and a second plane at different vibrational frequencies and vibrational magnitudes that are proportionate to a physical characteristic, such as a density, a volume, a weight, a shape, or a temperature, of each item to be dispensed. Moreover, a physical characteristic of each item may be measured as the items are dispensed singularly from the dispensing paths. Predetermined quantities of items may be directed to a container or diverted away from a container.

According to yet another embodiment of the present invention, a method of dispensing items from a dispenser comprises the steps of delivering a plurality of items onto a feeder bowl, and vibrating the feeder bowl, such that the items are supplied uniformly from the feeder bowl to a plurality of dispensing paths positioned around the feeder bowl the method also comprises the steps of rotating the dispensing paths, and vibrating the dispensing paths, such that the dispensing paths dispense the items singularly.

According to still yet another embodiment of the present invention, a dispenser comprises a feeder bowl for receiving items to be dispensed, a first vibration device for vibrating the feeder bowl, and a plurality of dispensing paths positioned around the feeder bowl. The dispenser also comprises a rotation drive for rotating the dispensing paths. Moreover the dispensing paths comprise at least one second vibration device for vibrating the dispensing paths proportionately to a physical characteristic of each of the items, such that the dispensing paths dispense the items singularly.

According to another embodiment of the present invention, a dispensing system comprises a dispenser. The dispenser comprises a feeder bowl for receiving items, a first vibration device for vibrating the feeder bowl, one or more dispensing paths positioned around the feeder bowl, and a rotation drive for rotating the one or more dispensing paths. The one or more dispensing paths comprise at least one second vibration device for vibrating the one or more dispensing paths proportionately to at least one physical characteristic of the items. The dispensing system also comprises one or more dispensing heads, and each of the one or more dispensing heads receives items from at least one of the one or more dispensing paths. Each dispensing head comprises a dispensing chute for directing a first plurality of the received items toward the dispenser, and the at least one physical characteristic of each of the first plurality of the received items is within a predetermined range of physical characteristics. Each dispensing head also comprises a diversion chute for directing a second plurality of the received items away from the dispenser.

Other objects, features, and advantages of embodiments of the present invention will be apparent to persons of ordinary skill in the art from the following description of preferred embodiments with reference to the accompanying drawings.

BRIEF DESCRIPTION OF DRAWINGS

The present invention may be understood more readily with reference to the following drawings.

FIGS. 11a–11h show an operation of a dispensing head according to an embodiment of the present invention.

DETAILED DESCRIPTION OF PREFERRED EMBODIMENTS

Figure 1:
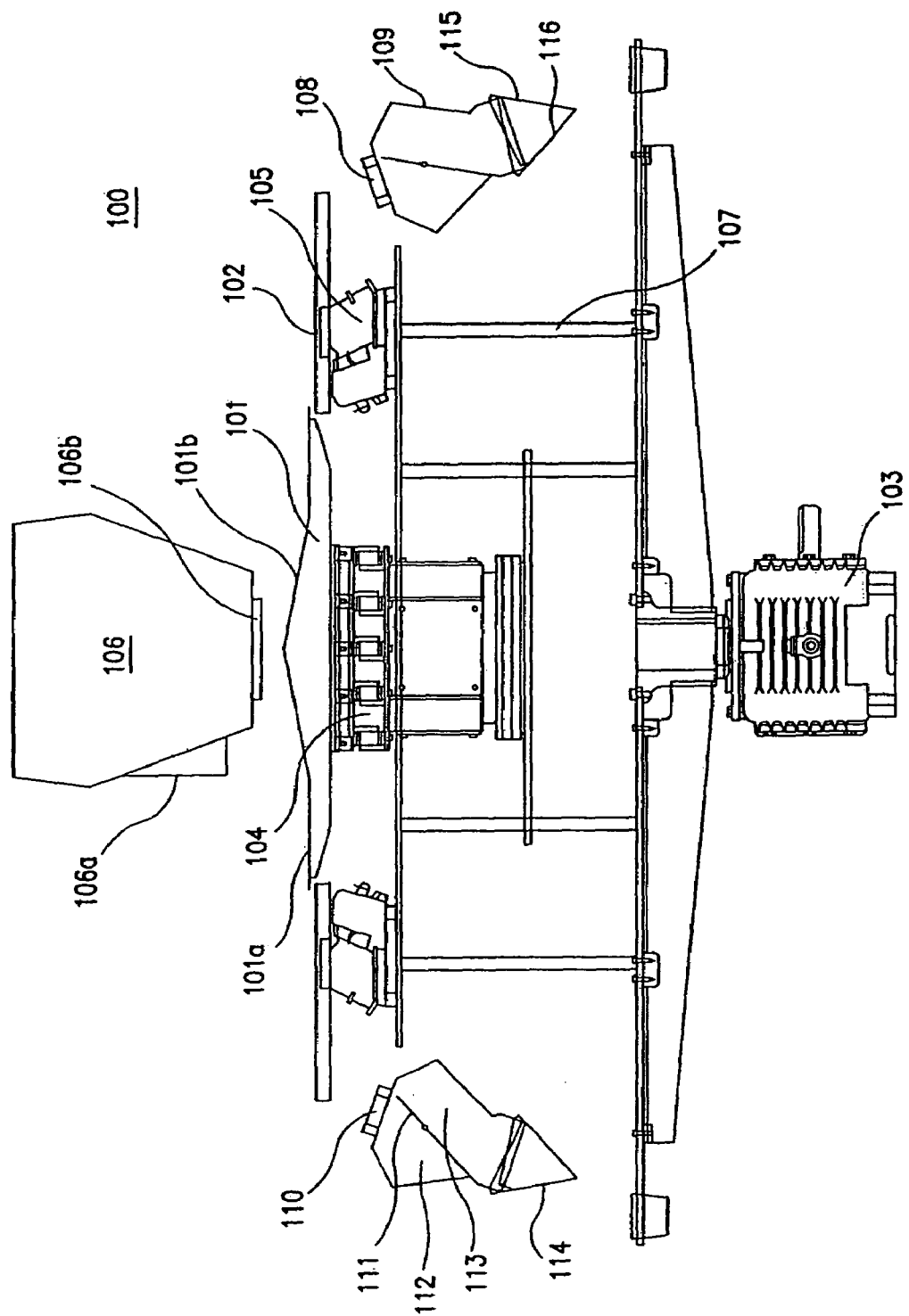
FIG. 1 shows a cross-sectional view of a rotary, vibratory dispenser according to an embodiment of the present invention.

Referring to FIG. 1, a rotary, vibratory dispenser 100 according to an embodiment of the present invention includes a feeder bowl 101 for receiving a plurality of items to be dispensed from the rotary vibratory dispenser 100, a plurality of dispensing paths 102 positioned around feeder bowl 101 for receiving items supplied by feeder bowl 101, a feeder bowl rotation drive 103 for rotating feeder bowl 101, a feeder bowl vibration device 104 for vibrating feeder bowl 101, and one or more dispensing path vibration devices 105 for vibrating each dispensing path 102, so that each dispensing path 102 may dispense items singularly, sensing units 108 for measuring a physical characteristic, e.g., a volume, a weight, a density, or the like, of each singularly-dispensed item, and dispensing heads 109 for receiving singularly-dispensed items from each dispensing path 102, so that items may be directed in predetermined quantities to a container. A bulk delivery apparatus 106, e.g., a hopper, a conveyor, or the like, may deliver items to rotary, vibratory dispenser 100, e.g., to the feeder bowl 101 of rotary, vibratory dispenser 100.

Rotary, vibratory dispenser 100 may be used to receive and dispense a variety of food items, e.g., dried food items, frozen food items, thawed food items, or the like. For example, rotary, vibratory dispenser 100 may dispense dried food items, such as dried pasta, dehydrated vegetables, or the like. Moreover, rotary, vibratory dispenser 100 may be used to dispense frozen food items, e.g., frozen meats, frozen vegetables, or the like. Rotary, vibratory dispenser 100 may be used to dispense items of varying physical characteristic, e.g., varying weight, volume, density, temperature, or the like, including non-food items of varying physical characteristic. For example, the rotary, vibratory dispenser 100 may dispense fasteners, hardware, medical items, electronic parts, mechanical parts, metallic and non-metallic items, or the like.

Figure 9A:
FIG. 9a shows a cross-sectional view of a dome-shaped feeder bowl according to an embodiment of the present invention
Figure 9B:
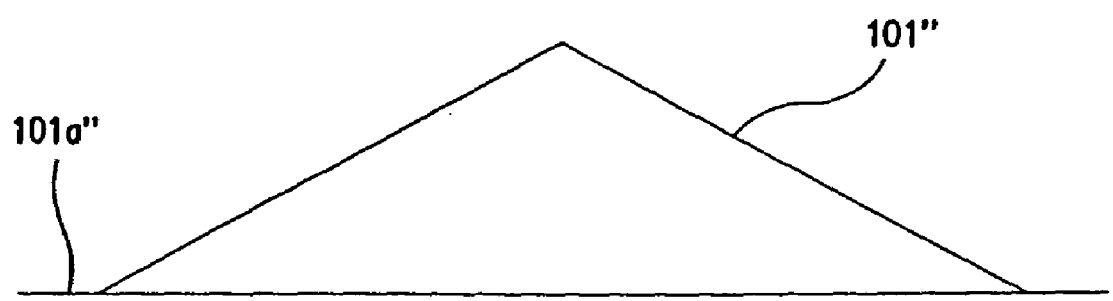
FIG. 9b shows a cross-sectional view of a conical-shaped feeder bowl according to an embodiment of the present invention.

Feeder bowl 101 may include a variety of shapes and configurations. The configuration of feeder bowl 101 may vary, depending upon the intended application and physical characteristic, e.g., a weight, a volume, a density, or the like, of items to be dispensed. FIG. 1 shows an embodiment of a feeder bowl 101 with an attenuated conical shape and a substantially planar peripheral edge 101a. Feeder bowl 101 may be substantially dome-shaped, substantially conical-shaped, substantially-planar, or the like. Moreover, each of these embodiments of feeder bowl 101 may include a substantially planar peripheral edge 101a. FIG. 9a shows a cross-section of a dome-shaped feeder bowl 101' with a substantially planar peripheral edge 101a'. FIG. 9b shows a cross-section of a conical-shaped feeder bowl 101" with a substantially planar peripheral edge 101a".

Figure 9C:
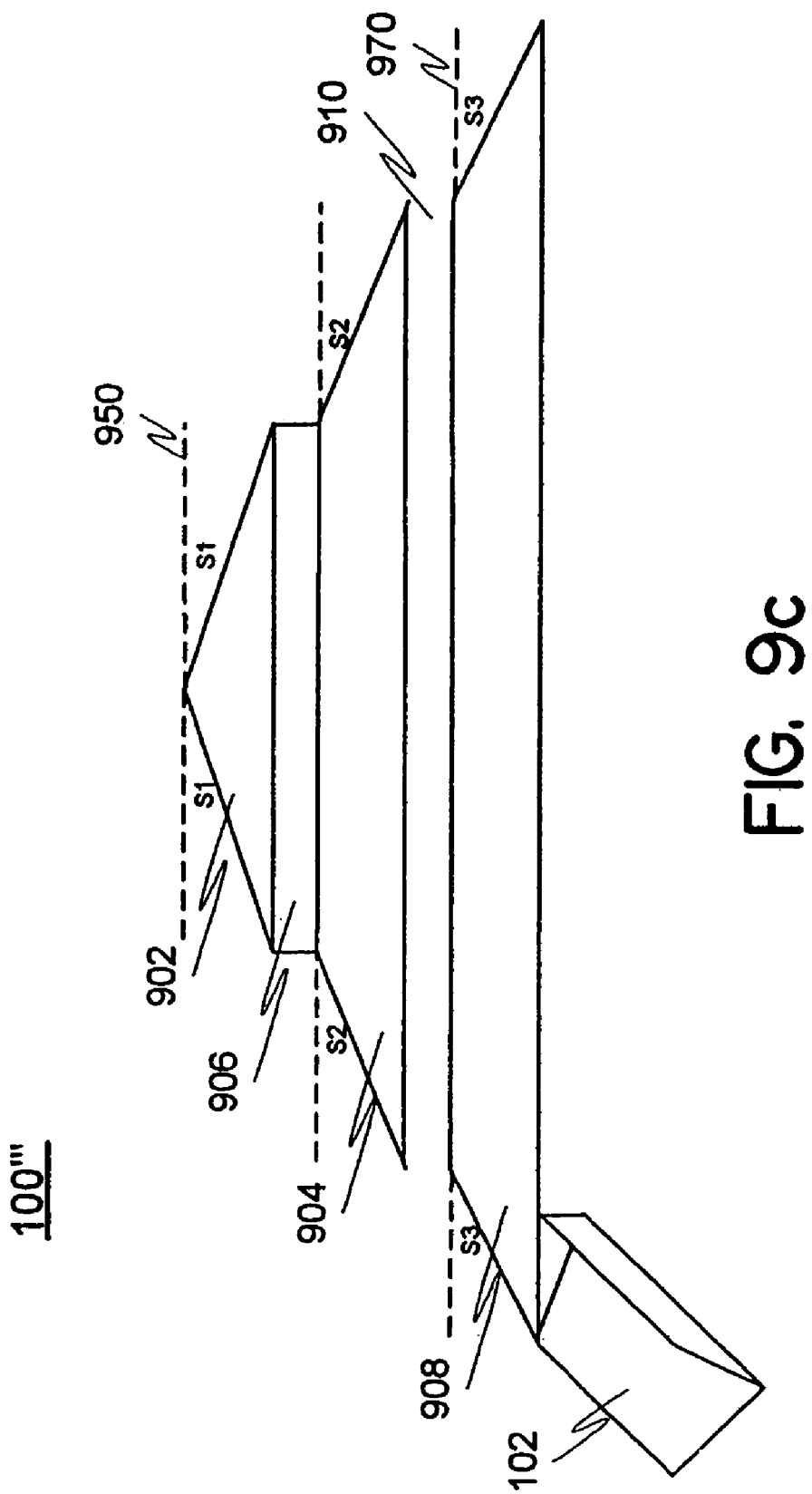
FIG. 9c shows a cross-sectional view of a sloped feeder bowl according to an embodiment of the present invention.

FIG. 9c shows a feeder bowl 101''' according to yet another embodiment of the present invention. Feeder bowl 101''' may comprise a plurality of sloped portions, and each of the sloped portions may be separated by a substantially cylindrical portion. For example, feeder bowl 101''' may comprise a first sloped portion 902 and a second sloped portion 904 connected to first sloped portion 902 via a substantially cylindrical portion 906. Cylindrical portion 906 may form a vertical drop between first sloped portion 902 and second sloped portion 904. In an embodiment, a thickness of cylindrical portion 906 may be selected, such that a distance between first sloped portion 902 and second sloped portion 904 is about 25.4 mm (about 1 inch). Moreover, first sloped portion 902, second sloped portion 904, and substantially cylindrical portion 906 may be stationary portions, i.e., non-rotating portions, or vibratory portions, or both. First sloped portion 902 and second sloped portion 904 may gradually accelerate the fall of items dispensed by bulk delivery apparatus 106 to feeder bowl 101'''. Specifically, a slope S1 of second sloped portion 904 may be greater than a slope S2 of first sloped portion 902, such that an item's speed increases between first sloped portion 902 and second sloped portion 904. In a preferred embodiment, first sloped portion 902 may be inclined in a downward direction relative to a first horizontal plane 950, and slope S1 of first sloped portion 902 may be about 9.5° relative to first horizontal plane 950. Moreover, second sloped portion 904 may be inclined in a downward direction relative to a second horizontal plane 960 which is parallel to first horizontal plane 950, and slope S2 of second sloped portion 904 may be about 12° relative to second horizontal plane 960. This preferred embodiment achieved superior performance with most items tested. Nevertheless, in yet another embodiment, slope S1 of first sloped portion 902 and slope S2 of second sloped portion 904 may be varied, depending on the type of item dispensed from bulk delivery apparatus 106.

Feeder bowl 101''' also may comprise a sloped member 908 fixed to dispensing paths 102, such that sloped member 908 may rotate with dispensing paths 102. Sloped member 908 may be separate from second sloped portion 904, such that a gap 910 is formed between second sloped portion 904 and sloped member 908. In an embodiment, sloped member 908 may be inclined in a downward direction relative to a third horizontal plane 970 which is parallel to second horizontal plane 960. In operation, items fall from second sloped portion 904 onto the surface of sloped member 908 and, subsequently may become airborne. A slope S3 of sloped member 908 relative to third horizontal plane 970 may be selected to reduce the amplitude of the airborne items. For example, slope S3 of sloped portion 908 may be between about 1° and about 15°, and in a preferred embodiment, slope S3 of sloped portion 908 is about 15°. Moreover, dispensing paths 102 may be inclined in a downward direction, such that a slope of dispensing paths 102 is about the same as slope S3 of sloped member 908. Although in FIG. 9c sloped member 908 is depicted as a single portion member, sloped member may be divided into a plurality of sloped portions having varying slopes, such as described above with respect to first sloped portion 902, second sloped portion 904, and substantially cylindrical portion 906.

Feeder bowl 101 may include a variety of item-receiving surfaces 101b, each of which item-receiving surfaces 101b enables feeder bowl 101 to receive a plurality of items of a particular physical characteristic, e.g., a weight, a volume, a density, a temperature, a friction coefficient of a surface of an item, or the like, and to supply the items uniformly, e.g., at a similar rate, to dispensing paths 102 positioned around the feeder bowl 101. For example, item-receiving surface 101b of feeder bowl 101 may be substantially smooth. Such substantially smooth item-receiving surfaces are available from RIMEX Metals (USA) Inc. of Edison, N.J.

Figure 7A:
FIGS. 7a–7c show textured item-receiving and item-dispensing surfaces according to an embodiment of the present invention.
Figure 7B:
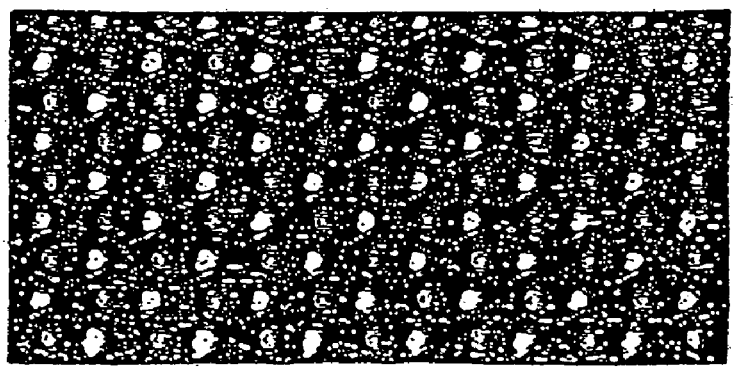
Figure 7C:

According to another embodiment of the present invention, item-receiving surface 101b may be textured, as shown in FIGS. 7a–7c. Such textured item-receiving surfaces 101b are available from RIMEX Metals (ISA) Inc. of Edison, N.J. A textured item-receiving surface 101b may include a plurality of substantially circular, concave or convex dimples formed in a substantially planar material, as shown in FIGS. 7a and 7b. A diameter of each dimple may vary, as may a height or depth of each dimple and a spacing between adjacent dimples, so that the number and size of dimples per unit area may vary. Each dimple may be substantially oval-shaped, elliptical-shaped, or the like, or the textured item-receiving surface 101b may include a combination of dimples of different shapes, sizes, and configurations. A textured item-receiving surface 101b of feeder bowl 101 may include a plurality of raised portions, e.g., lines, in addition to, or instead of, raised dimples, as shown in FIG. 7a. A textured feeder bowl item-receiving surface 101b may include other arrangements or patterns of geometric shapes, e.g., diamonds, triangles, rectangles, or the like, arranged in different dimensions, patterns, and arrangements.

A plurality of dispensing paths 102 may be positioned around feeder bowl 101 to receive items supplied by feeder bowl 101. Dispensing paths 102 may be positioned around a periphery of feeder bowl 101 and extend radially from the periphery of feeder bowl 101, as shown in FIG. 1, to receive items supplied by feeder bowl 101. The length of each dispensing path 102 may vary depending upon a variety of factors, such as the space available for the rotary, vibratory dispenser, a physical characteristic of items to be dispensed, a desired dispensing rate, a rotational speed of the dispensing paths 102, or the like. The number of dispensing paths 102 may vary. For example, forty-eight (48) dispensing paths 102 may be positioned around feeder bowl 101. According to one embodiment of the invention, one hundred (100) dispensing paths 102 may be positioned around feeder bowl 101. In another embodiment of the invention, twelve (12) dispensing paths 102 may be positioned around feeder bowl 101. However, any number of dispensing paths 102 may be positioned around feeder bowl 101.

Figure 2:
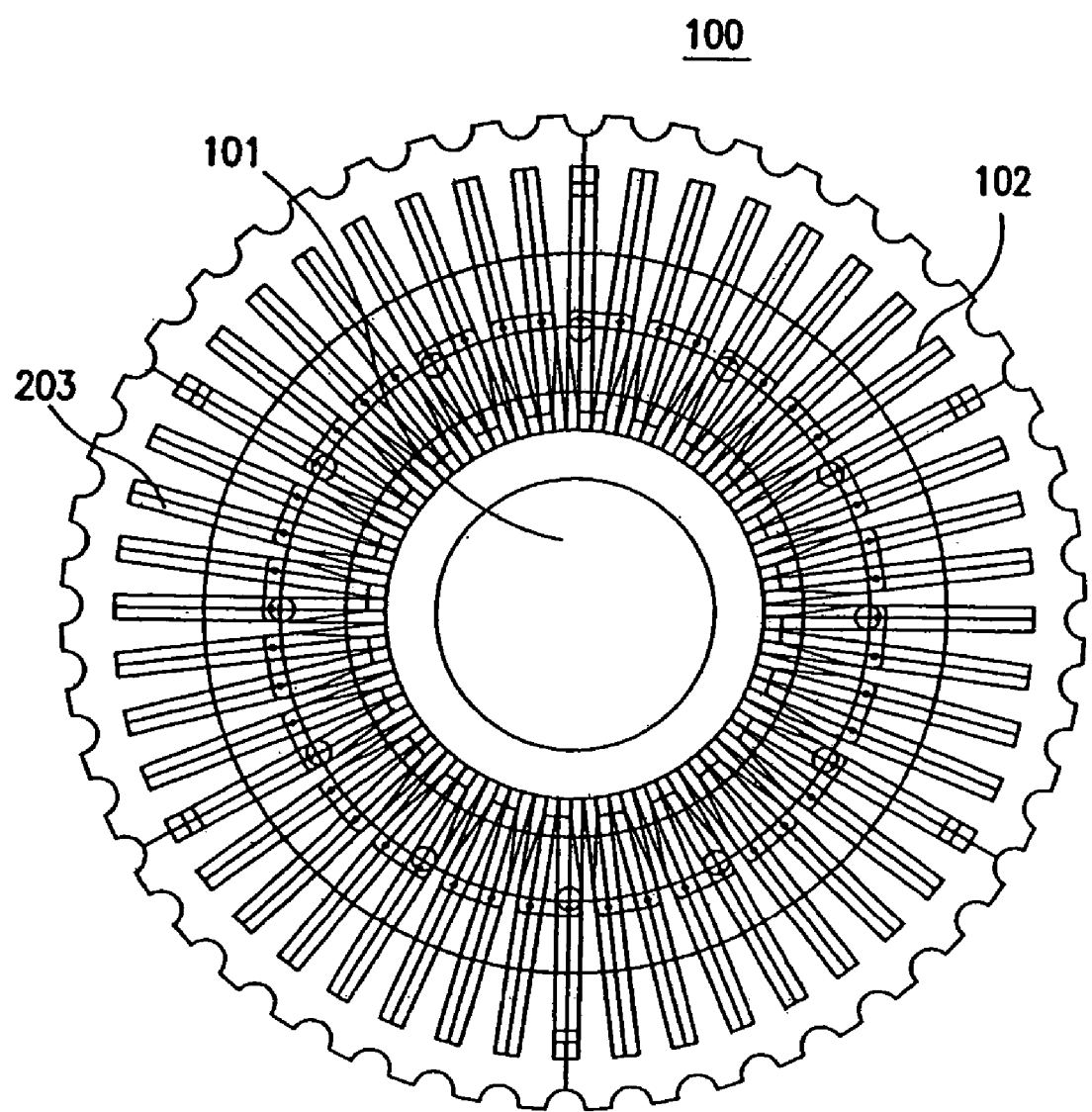
FIG. 2 shows a partially cutaway, plan view of a rotary, vibratory dispenser according to the present invention.

Dispensing paths 102 may be positioned around feeder bowl 101 in a variety of configurations. For example, dispensing paths 102 may be positioned around a periphery of feeder bowl 101 and extend radially from feeder bowl 101, as shown in FIG. 2. The length of each dispensing path 102 may vary depending upon a variety of factors, such as the space available for the rotary, vibratory dispenser, a physical characteristic of items to be dispensed, a desired dispensing rate, a rotational speed of the dispensing paths 102, or the like. The number of dispensing paths 102 may vary depending upon a variety of factors, such as a desired dispensing rate, a physical characteristic of items to be dispensed, or the like. For example, forty-eight (48) dispensing paths 102 may be positioned around feeder bowl 101, as shown in FIG. 2. According to one embodiment of the invention, one hundred (100) dispensing paths 102 may be positioned around feeder bowl 101. In another embodiment of the invention, twelve dispensing paths 102 may be positioned around feeder bowl 101. However, any number of dispensing paths 102 may be positioned around feeder bowl 101.

Figure 3:
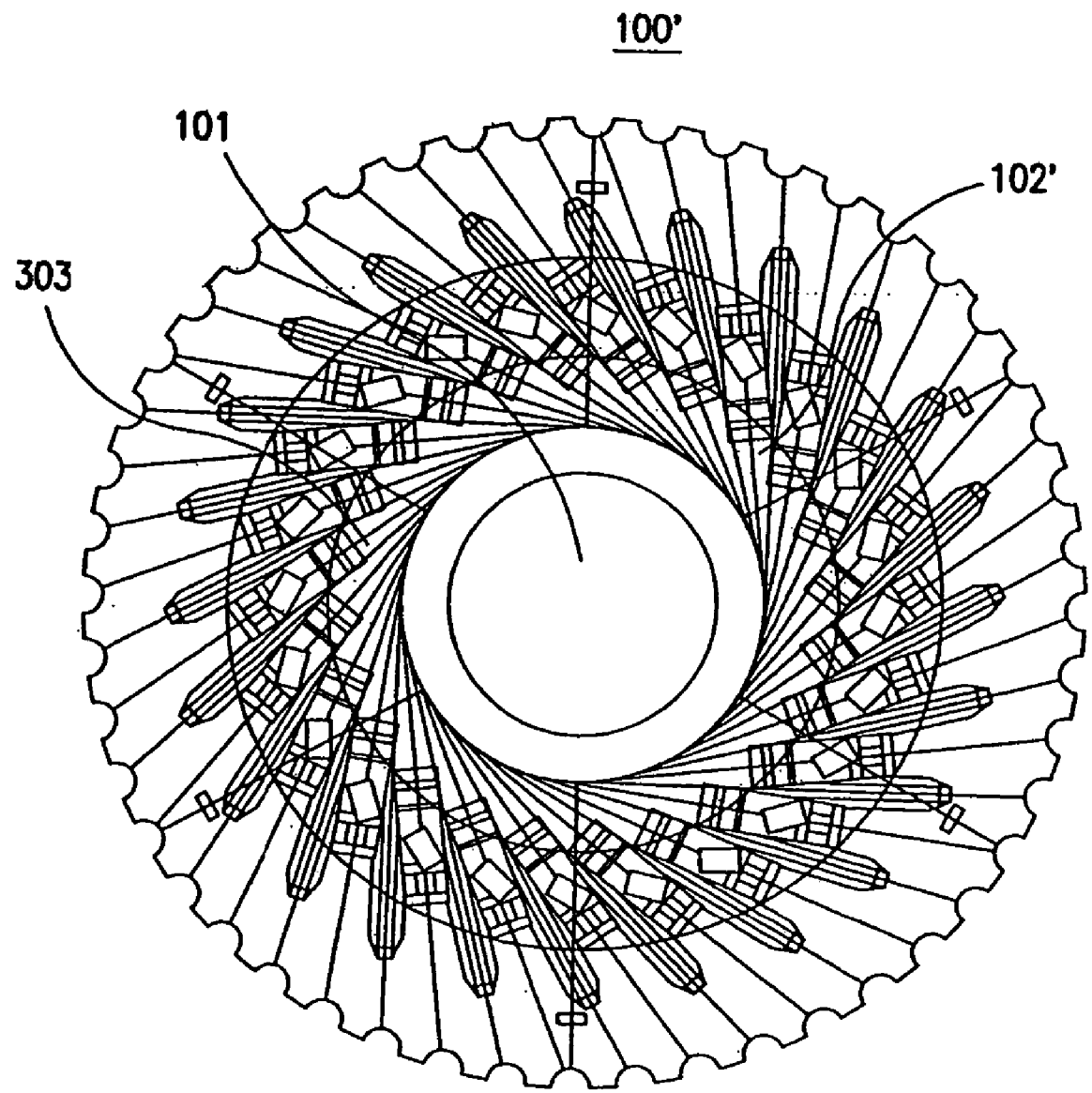
FIG. 3 shows a partially cutaway, plan view of a rotary, vibratory dispenser according to another embodiment of the present invention.

Dispensing paths 102' may be positioned around a periphery of feeder bowl 101 and extend in an arc-shaped pattern from feeder bowl 101, opposite to a direction of rotation of feeder bowl 101, as shown in FIG. 3. The length of each dispensing path 102' may vary depending upon the space available for the rotary, vibratory dispenser, the arc of the dispensing paths, a physical characteristic of items to be dispensed, a desired dispensing rate, a rotational speed of the dispensing paths 102', or the like. The number of dispensing paths 102 may vary depending upon a variety of factors, such as a desired dispensing rate, a physical characteristic of items to be dispensed, or the like. For example, forty-eight (48) dispensing paths 102' may be positioned around feeder bowl 101, as shown in FIG. 3. According to one embodiment of the invention one hundred (100) dispensing paths 102' may be positioned around feeder bowl 101. In another embodiment of the invention, twelve dispensing paths 102' may be positioned around feeder bowl 101. However, any number of dispensing paths 102' may be positioned around feeder bowl 101.

Each dispensing path 102, 102' may comprise one or more item-dispensing channels, each of which channels may receive items supplied by feeder bowl 101 and dispense items singularly. For example, each dispensing path 102 may comprise a single channel 203, 303, as shown in FIGS. 2 and 3. However, each dispensing path 102, 102' may include two or more channels, each of which channels may dispense items singularly to a dispensing head 109. Thus, according to an embodiment of the invention in which rotary, vibratory dispenser 100 is configured with forty-eight (48) dispensing paths 102 and each dispensing path 102, includes two channels, rotary, vibratory dispenser 100 may dispense items from each of the ninety-six (96) channels. The number of channels may vary depending upon the number of containers to be filled at a rotary, vibratory dispenser, the number of dispensing heads 109 and sensing units 108, or the like.

Figure 4A:
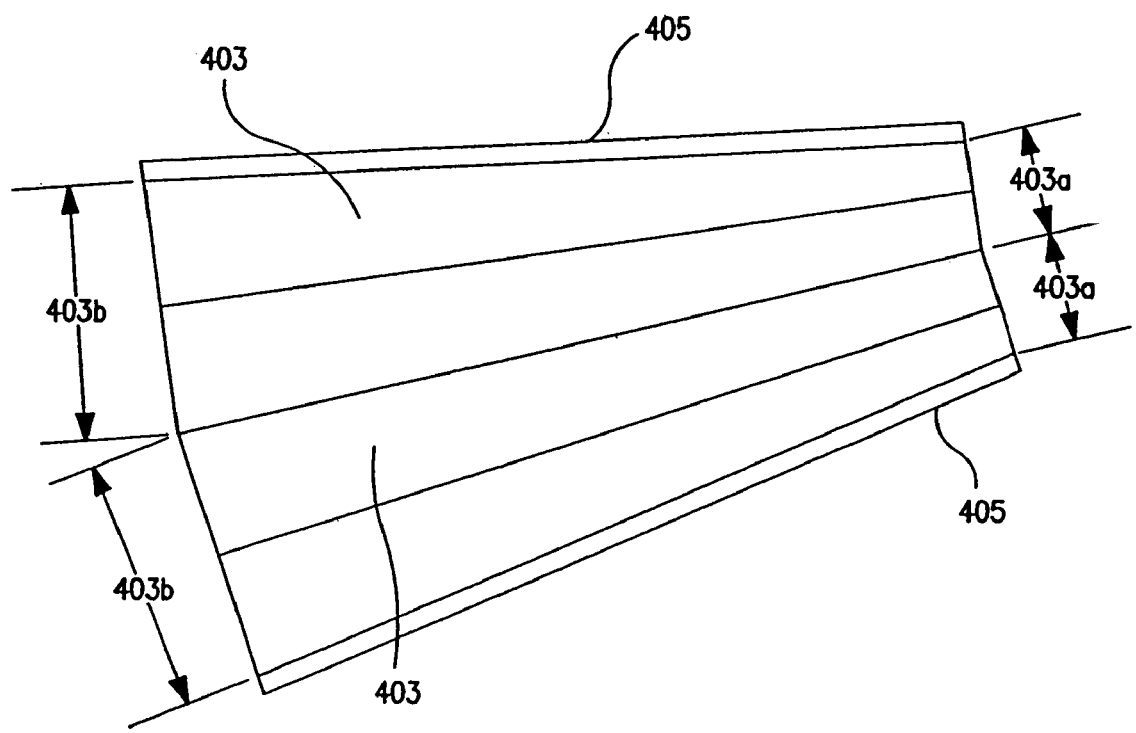
FIG. 4a shows a top view of a channel according to the present invention.

Each channel 203 may have a substantially constant width and extend radially from feeder bowl 101, as shown in FIG. 2. In another embodiment of the invention, a width of each channel 303 may increase as each channel extends radially from feeder bowl, as shown in FIG. 3. FIG. 4a shows a pair of channels 403, 403 of increasing width. Each channel 403 has a portion of narrower width 403a at one end and a portion of greater width 403b at another end. The portion of narrower width 403a of each channel 403 may be positioned adjacent to feeder bowl 101 to receive items supplied from feeder bowl 101. Depending upon the number of channels 403 positioned around feeder bowl 101 and the dimensions of each channel 403, outer edges 405 of adjacent channels 403 may contact. In this way, the plurality of channels 403 may form a continuous item-dispensing surface extending from a periphery of feeder bowl 101 to receive a plurality of items supplied by feeder bowl 101.

Figure 4B:
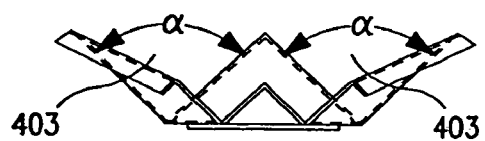
FIG. 4b shows an end view of the channel of FIG. 4a, according to the present invention
Figure 4C:
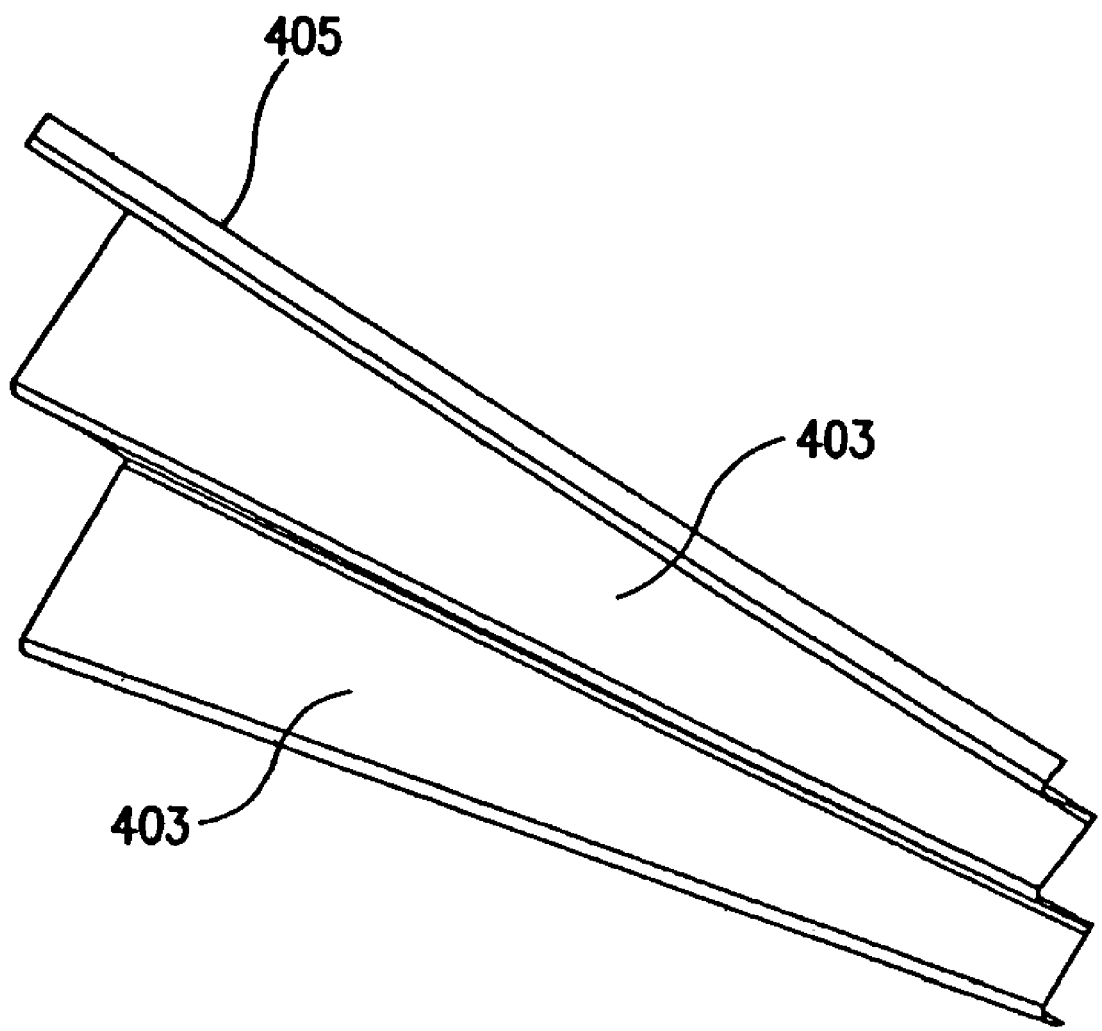
FIG. 4c shows a perspective view of the channel of FIG. 4a, according to the present invention.

Each channel 403 may have a substantially V-shaped cross-section, such that a pair of channels 403, 403 may have a substantially W-shaped cross-section, as shown in FIGS. 4b and 4c. Each channel may have a U-shaped, so that a pair of such channels has a double-U-shaped cross-sectional configuration. Further, a depth of each channel 403 may increase as each channel 403 extends from a portion of narrower width 403a to a portion of greater width 403b, as shown in FIG. 4c. Thus, a depth of each channel 403 may increase as each channel 403 extends radially from a periphery of feeder bowl 101.

The angle of offset α of adjacent sides of a channel 403 may vary, as well. For example, the angle of offset α may be about 90°, as shown in FIG. 4b. However, the angle of offset α may be an acute angle or an obtuse angle; depending upon a physical characteristic, e.g., a weight, a volume, a density, or the like, of items to be dispensed. The cross-sectional configuration, depth, and angle of offset α of each channel 403 may vary according to a physical characteristic of items to be dispensed, so that each channel 403 may receive a plurality of items supplied by feeder bowl 101, sort the items into a single file as the items travel along each channel 403, and dispense the items singularly from a distal end of each channel 403 to improve the accuracy of a count or a measurement or both of each dispensed item.

In another embodiment of the invention, each channel 303 may be arc-shaped and extend in an arc-shaped pattern from a periphery of feeder bowl 101, as shown in FIG. 3. A width of each channel may increase as each channel extends from feeder bowl 101. A depth of each channel may increase as each channel extends from feeder bowl 101. Each channel 303 may have a substantially V-shaped cross-sectional configuration or a substantially U-shaped cross-sectional configuration. In an embodiment in which a dispensing path 102' includes a pair of item-dispensing channels 303, the pair of channels may have a substantially W-shaped cross-sectional configuration or a substantially double-U-shaped cross-sectional configuration.

The cross-sectional configuration, depth, and angle of offset of each channel 303 may vary according to a physical characteristic of each item to be dispensed, so that each arc-shaped channel may receive a plurality of items supplied by feeder bowl 101, sort the items into single file as the items travel along each channel, and dispense the items singularly from a distal end of each channel to improve the accuracy of a count or a measurement or both of each dispensed item.

Each channel 203, 303, 403 may include a substantially smooth or a textured item-dispensing surface depending upon a physical characteristic, e.g., a weight, a volume, a density, a temperature, a coefficient of friction of a surface, or the like, of each item to be dispensed. The item-dispensing surfaces improve the ability of channels to receive a plurality of items of a particular physical characteristic, to sort the items into single file as the items travel along each channel, and to dispense the items singularly from a distal end of each channel.

Each channel may have a substantially smooth item-dispensing surface, e.g., as shown in FIG. 4c, or a textured item-dispensing surface, as shown in FIGS. 7a–7c. Such smooth and textured item-dispensing surfaces are available from RIMEX Metals (USA) Inc. of Edison, N.J. A textured item-dispensing surface of a channel may be dimpled and may include a plurality of substantially circular, concave or convex dimples formed in a substantially planar material, as shown in FIGS. 7a and 7b. A diameter of each dimple may vary, as may a height or depth of each dimple and a spacing between adjacent dimples, so that the number and size of dimples per unit area may vary depending upon the desired application. Each dimple may be substantially oval-shaped, elliptical-shaped, or the like, or a textured item-dispensing surface may include a combination of dimples of different shapes, sizes, and configurations. A textured item-dispensing surface of channel may include a plurality of raised portions, e.g., lines, in addition to concave or convex dimples, as shown in FIG. 7a. Textured item-dispensing channel surfaces may include other patterns and arrangements of geometric shapes, e.g., diamonds, triangles, rectangles, or the like.

A bulk delivery apparatus 106 may be used to deliver items to rotary, vibratory dispenser 100. Bulk delivery apparatus 106 may be positioned adjacent to rotary, vibratory dispenser 100, as shown in FIG. 1, to deliver items to rotary, vibratory dispenser 100, e.g., to feeder bowl 101 of rotary, vibratory dispenser 100. Bulk delivery apparatus 106 may include a bulk delivery drive 106a, e.g., a vibration device, a motor, or the like, for controlling a rate of delivery of items from bulk delivery apparatus 106 to rotary, vibratory dispenser 100. Adjustment of bulk delivery drive 106a enables adjustment of the rate of delivery of items from bulk delivery apparatus 106.

As shown in FIG. 1, bulk delivery apparatus 106 may include a hopper 106 and hopper vibration device 106a for vibrating hopper 106, so that items may be delivered at different rates to feeder bowl 101 of rotary, vibratory dispenser 100. Such hopper vibration devices 106a may include Syntron® Electromagnetic Vibrators, which are available from FMC Technologies Material Handling Solutions of Homer City, Pa. Other hoppers 104 and hopper vibration devices 104a may include the Skako Comassa Feeders, which are available from Skako, Inc. of Faaborg, Denmark.

In another embodiment of the invention, bulk delivery apparatus 106 may include a conveyor or the like for delivering items to feeder bowl 101 of rotary, vibratory dispenser 100. In a further embodiment of the invention, the rate of delivery of items from bulk delivery apparatus 106 to rotary, vibratory dispenser 100 may be regulated by adjusting an aperture, or the like, of bulk delivery apparatus 106.

Bulk delivery apparatus 106 may include a sensing unit 106b for counting or measuring items delivered from bulk delivery apparatus 106 to feeder bowl 101. Sensing unit 106b may comprise a scale, e.g., a strain gauge, for weighing items in bulk delivery apparatus 106 and for determining a weight of items delivered from bulk delivery apparatus 106 to feeder bowl 101 in a given time period. Sensing unit 106b may include one or more optic sensors, infrared sensors, electromagnetic radiation sensors, proximity sensors, capacitative sensors, or the like, such as are available from IFM Efector, Inc., Exton, Pa. Sensing unit 106b may be positioned at bulk delivery apparatus 106 to count, e.g., to sense or the like, items dispensed from bulk delivery apparatus, so that bulk delivery apparatus 106 may deliver items to rotary, vibratory dispenser 100 at a rate sufficient to enable rotary, vibratory dispenser 100 to dispense a predetermined number of items to containers or the like at a desired rate, e.g., at a desired number of containers per minute, or the like. Sensing unit 106b and bulk delivery drive 106a enable controlled delivery of items from bulk delivery apparatus 106 at different rates.

Feeder bowl rotation drive 103 may rotate feeder bowl 101 at varying rotational speeds. In an embodiment of the invention in which feeder bowl 101 and each dispensing path 102 may be positioned on a common rotatable frame 107, as shown in FIG. 1, feeder bowl rotation drive 103 may rotate rotatable frame 107 and thus feeder bowl 101 and dispensing paths 102 at a rotational speed that may correspond to a desired rate of filling containers at rotary, vibratory dispenser 100. For example, if rotary, vibratory dispenser 100 includes 48 dispensing paths 102 and each dispensing path 102 includes two item-dispensing channels, and rotary, vibratory dispenser 100 must fill 480 containers per minute, feeder bowl rotation drive 103 may rotate feeder bowl 101 and dispensing paths 102 at five (5) revolutions per minute (rpm), so that rotary, vibratory dispenser 100 may dispense items to 480 containers per minute. If each dispensing path 102 includes a single item-dispensing channel, rotation drive 103 may rotate feeder bowl 101 and dispensing paths 102 at ten (10) ten rpm, so that rotary, vibratory dispenser 100 may dispense items to 480 containers per minute.

According to an embodiment of the present invention in which dispensing paths 102 may rotate independently of feeder bowl 101, feeder bowl rotation drive 103 may rotate each dispensing path 102 at a substantially similar rotational speed as feeder bowl 101, or feeder bowl rotation drive 103 may rotate dispensing paths 102 at a different rotational speed than feeder bowl 101, e.g., via a transmission (not shown), so that a rotational speed of dispensing paths 102 may be varied relative to a rotational speed of feeder bowl 101. In a still further embodiment of the invention, feeder bowl rotation drive 103 may rotate dispensing paths 102 in a direction of rotation that is opposite to a direction of rotation of feeder bowl 101. In each of these embodiments, feeder bowl rotation drive 103 may rotate dispensing paths 102 at a rotational speed that corresponds to a desired rate of filling containers at rotary, vibratory dispenser 100.

Feeder bowl vibration device 104 may vibrate feeder bowl 101 at different vibrational settings, e.g., at different vibrational magnitudes, at different vibrational frequencies, in different vibrational planes, or combinations thereof, so that feeder bowl 101 may supply items uniformly, e.g., at similar rates, to each dispensing path 102. Feeder bowl vibration device 104 may vibrate feeder bowl 101 at different vibrational settings in a first plane, in a second plane, or in a first plane and a second plane. First plane and second plane may be transverse to one another. In particular, first plane may be a substantially horizontal plane, while second plane may be a substantially vertical plane. Feeder bowl vibrational settings may be proportionate to a physical characteristic, e.g., a density, a volume, a weight, a temperature, or the like, of items to be supplied by feeder bowl 101 to dispensing paths 102. Such feeder bowl vibration devices 104 may include Syntron® Electromagnetic Vibrators, which are available from FMC Technologies Material Handling Solutions of Homer City, Pa.

Feeder bowl vibrational settings may correspond to one or more of a rate of delivery of items to feeder bowl 101, a rotational speed of feeder bowl 101, and a desired rate of supplying items from feeder bowl 101 to dispensing paths 102, so that feeder bowl 101 may receive a plurality of items, e.g., from bulk delivery apparatus 106, and supply items uniformly to each dispensing path 102. For example, if rotary, vibratory dispenser includes 48 dispensing paths 102, each dispensing path includes a single item-dispensing channel, and rotary, vibratory dispenser 100 must dispense ten items to each of 480 containers per minute, feeder bowl vibration device 104 may vibrate feeder bowl 101, so that feeder bowl 101 may supply about 4,800 items per minute uniformly to each of the 48 dispensing paths 102.

Feeder bowl rotation drive 103 may rotate feeder bowl 101 and feeder bowl vibration device 104 may vibrate feeder bowl 101 at various combinations of rotational speeds and vibrational settings, so that feeder bowl 101 may receive a plurality of items, e.g., from a bulk delivery apparatus 106, and supply the items uniformly to each dispensing path 102. By rotating and vibrating feeder bowl 101 at different rotational speeds and vibrational settings, feeder bowl rotation drive 103 and feeder bowl vibration device 104 enable feeder bowl 101 to receive and supply greater quantities of items to dispensing paths 102 than known dispensers, thereby improving the dispensing rate of rotary, vibratory dispenser 100 over known dispensers.

Dispensing path vibration devices 105 may vibrate each dispensing path 102, e.g., each channel 403 of each dispensing path 102. Dispensing path vibration devices 105 may vibrate each dispensing path 102 and channel 403 at different vibrational settings, e.g., at different vibrational frequencies, at different vibrational magnitudes, in different vibrational planes, or combinations thereof, or both. Moreover, each dispensing path vibration device 105 may vibrate each dispensing path 102 at different vibrational settings in a first plane, or a second plane, or in a first plane and a second plane. First plane and second plane may be transverse. In particular, first plane may be substantially horizontal, while second plane may be substantially vertical. Such dispensing path vibration devices 105 may include Syntron® Solid Mount Linear Drives, which are available from FMC Technologies Material Handling Solutions of Homer City, Pa.

Each dispensing path vibration device 105 may vibrate one or more respective dispensing paths 102 proportionately to a physical characteristic e.g., a density, a volume, a weight, a temperature, or the like, of each item. Moreover, each dispensing path vibration device 105 may vibrate each dispensing path 102 proportionately to one or more of a rate of supply of items from feeder bowl 101 to each dispensing path 102, a rotational speed of dispensing paths 102, or a desired dispensing rate of each dispensing path 102, so that each dispensing path 102 dispenses items singularly.

A separate dispensing path vibration device 105 may vibrate each dispensing path 102 and associated channel(s) 403 independently of every other dispensing path 102, e.g., at different vibrational settings, and independently of a vibration of feeder bowl 101 by feeder bowl vibration device 104. In another embodiment of the invention, each dispensing path vibration device 105 may vibrate two or more dispensing paths 102 and associated channels at similar vibrational settings. If each dispensing path 102 includes two or more item-dispensing channels 403, a dispensing path vibration device 105 may vibrate two or more channels 403 of a respective dispensing path 102 at a similar vibrational setting, or a dispensing path vibration device 105 may vibrate each channel 403 of a dispensing path 102, e.g., one, two, three, four, or more channels of a respective dispensing path 102 at a similar vibrational settings.

A sensing unit 108 may be positioned at each dispensing path 102 of rotary, vibratory dispenser 100. Moreover, a sensing unit 108 may be positioned adjacent to each item-dispensing channel of each dispensing path 102, e.g., adjacent to a distal end of each item-dispensing channel of each dispensing path 102. In embodiments of the invention in which a dispensing path 102 may include two or more item-dispensing channels 403, a sensing unit 108 may be positioned at each channel, e.g., at a distal end of each channel 403 of a dispensing path 102, so that each sensing unit 108 may measure a physical characteristic, e.g., a volume, a weight, a density, or the like, of each item dispensed from each channel, so that an accurate count of dispensed items may be obtained.

Sensing unit 108 may include optic sensors, infrared sensors, capacitative sensors, photoelectric sensors, laser sensors, fiber optic sensors, proximity sensors, or the like, such as are available from IFM Efector, Inc., Exton, Pa. A sensing unit 108 according to this embodiment of the invention may be positioned at a distal end of each item-dispensing channel for counting each item dispensed from each channel.

Sensing unit 108 may include a scale, or the like, for measuring a weight of each item dispensed from each channel. In another embodiment of the invention, sensing unit 108 may include an electromagnetic radiation sensor, such as those available from Batching Systems, Inc., Prince Frederick, Md., for measuring a volume of each dispensed item. Each electromagnetic radiation sensor may include a source of electromagnetic radiation directed onto an electromagnetic radiation detector, so that a volume of each item passing between the electromagnetic radiation source and electromagnetic radiation detector may be determined based on fluctuations in the amount of electromagnetic radiation detected as each item passes between the electromagnetic radiation source and the electromagnetic radiation detector.

According to a still further embodiment of the present invention, each sensing unit 108 may include a pair of sensing units. For example sensing unit 108 may include a scale and an electromagnetic sensor for measuring a weight and a volume, respectively, of each dispensed item. Sensing unit 108 may include an optical or proximity sensor and a scale for counting and measuring a weight, respectively, of each dispensed item.

Each sensing unit 108 may measure a physical characteristic of each dispensed item and transmit each measurement to a control unit (not shown), which determines whether the measurement is within a predetermined range of physical characteristics for a particular item. Control unit also may determine, based on measurements received from each sensing unit 108 whether or not each dispensing path and associated channel(s) is dispensing items singularly and, if necessary, adjust a vibrational setting of one or more respective dispensing path vibration devices 105, so that items are dispensed singularly. By measuring a physical characteristic of each dispensed item, sensing units 108 enable identification of each item whose measured physical characteristic is within a predetermined range of physical characteristics, such as a range of weights, volumes, densities, or the like. Moreover, sensing units 108 enable identification of each item whose measured physical characteristic is out-of-specification, e.g., greater than or less than a predetermined range of acceptable measurements. Sensing units 108 enable rotary, vibratory dispenser 100 to dispense predetermined quantities of items, each of which predetermined quantities comprises an exact count of items with a measured physical characteristic, e.g., a weight, a volume, a density, or the like, that is within a predetermined range of acceptable measurements.

A dispensing head 109 may be positioned at each dispensing path 102 to receive items dispensed from a respective dispensing path 102 and its associated item-dispensing channel. In embodiments of the invention in which a dispensing path 102 may include more than one item-dispensing channel, a dispensing head 109 may be positioned adjacent to each channel, e.g., at a distal end of each channel of a dispensing path 102, to receive items dispensed from each channel.

Each dispensing head 109 may include an opening 110 for receiving items dispensed from each dispensing path 102 and associated channel(s). In one embodiment of the invention, a sensing unit 108 may be positioned at each dispensing head 109, e.g., adjacent to an opening 110 of each dispensing head 109. Each sensing unit 108 may count each item or measure a physical characteristic of each item, as discussed previously, as items are received by dispensing head 109.

Dispensing head 109 may include a bifurcation device 111 for directing received items to a first chamber 112 or a second chamber 113 of each dispensing head 109. Moreover, each dispensing head 109 may include a holding chamber 114. Holding chamber 114 may be positioned at a lower portion of dispensing head 109. Holding chamber 114 may be selectively reconfigured to direct items within dispensing head 109 in a first direction, e.g., toward a container or the like, or to divert items in a second direction, e.g., away from a container or the like. In one embodiment of the present invention, holding chamber 114 may include a pair of doors 115, 116, as shown in FIG. 1.

Referring to FIGS. 11a–11h, in a modification of this embodiment of the present invention, holding chamber 114 may be replaced by a first holding chamber 114' and a second holding chamber 114", door 115 may be replaced by a first door 115', and door 116 may be replaced by a guiding wall 116' and a second door 116". First holding chamber 114' may be positioned below second holding chamber 114", and when second door 116" is in a closed position, holding chambers 114' and 114" may form a continuous chamber. Nevertheless, when second door 116" is in an open position, second door 116" may prevent the items from reaching first holding chamber 114'. Specifically, bifurcation device 111 may receive the items which pass through opening 110, such that the items are positioned within first chamber 112 or second chamber 113. When bifurcation device 111 receives a predetermined number of items which have acceptable physical characteristics, e.g., physical characteristics which are within a predetermined range of physical characteristics, bifurcation device 111 may direct the received items into first holding chamber 114' via second holding chamber 114". First door 115' then may move from a closed positioned to an open position, such that the items received by first holding chamber 114' are directed toward the container. Nevertheless, if bifurcation device 111 receives any item which does not have acceptable characteristics, e.g., physical characteristics which are greater than or less than the predetermined range of physical characteristics, second door 116" may move from the closed position to the open position, and bifurcation device 111 subsequently may direct the received items into second holding chamber 114". When bifurcation device 111 directs the received items into second holding chamber 114", bifurcation device 111 may receive new items, such that the new items may be positioned within first chamber 112 or second chamber 113. Moreover, when the received items reach second holding chamber 114", second door 116" may direct the received items away from the container. Consequently, when bifurcation device 111 receives an unacceptable item, each of the items received by the bifurcation device 111 may be directed away from the container without having to wait for bifurcation device 111 to receive the predetermined number of items. Moreover, the new items may be received by bifurcation device 111 without having to wait for second door 116" to direct the received items away from the container.

Figure 13A:
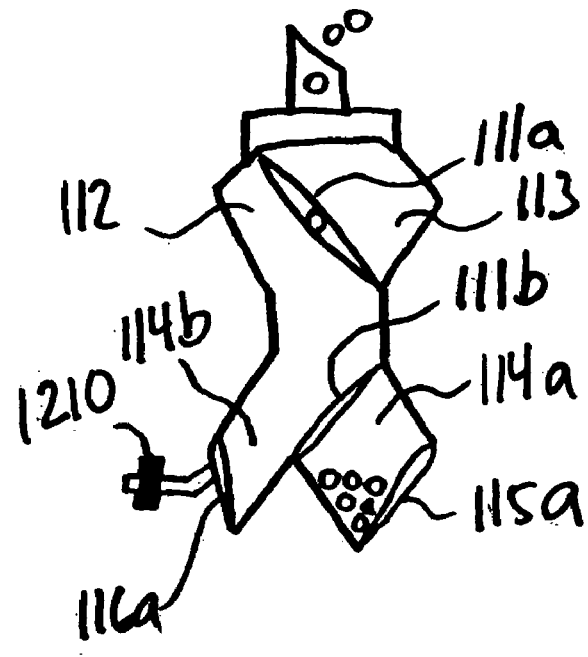
FIGS. 13a–13b show an operation of a dispensing head according to another embodiment of the present invention.
Figure 13B:
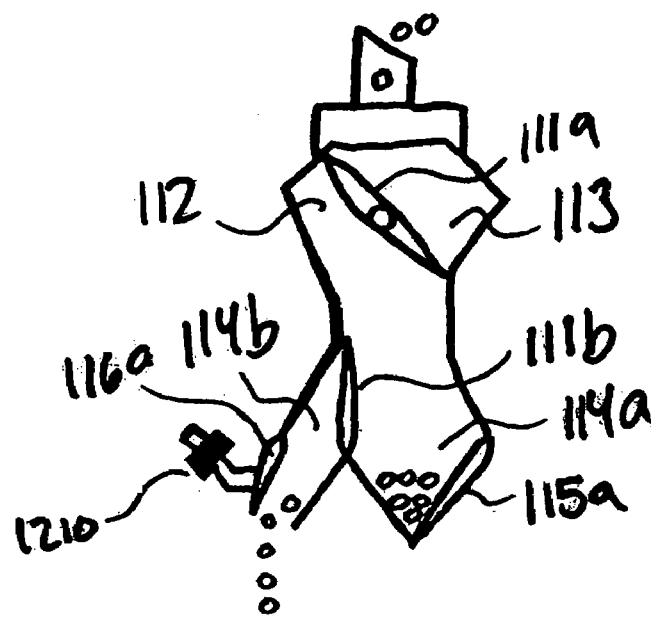

Referring to FIGS. 13*a* and 13*b*, in another modification of the embodiment of the present invention depicted in FIG. 1, bifurcation device 111 may be replaced by a first directional gate 111*a* and a second directional gate 11*b*, and holding chamber 114 may be replaced by a first holding chamber 114*a* and a second holding chamber 114*b*. In this embodiment, door 115 may be replaced by an accept door 115*a*, door 116 may be replaced by a recirculate door 116*a*, and dispensing head 109 may comprise means for releasing items from second holding chamber 114*b*. For example, the means for releasing may comprise a roller 1210 connected to recirculate door 116*a*. Moreover, dispensing system 100 may comprise means for separating items, e.g., a first strainer (not shown) and/or a second strainer (not shown). Specifically, the first strainer may be operationally positioned between bulk delivery apparatus 106 and dispensing head 109, such that the first strainer may prevent items having a diameter which is greater than a first predetermined diameter from entering dispensing head 109. The second strainer may be operationally positioned between second holding chamber 114*b* and bulk delivery apparatus 106, such that the second strainer prevents items which are released from second holding chamber 114*b* and have a diameter which is less than a second predetermined diameter from reentering dispensing head 109.

In operation, first directional gate 11*a* may receive the items which pass through the first strainer and opening 110, such that the items are positioned within first chamber 112 or second chamber 113. When first directional gate 11*a* receives a predetermined number of items which passed through at least the first strainer and have acceptable physical characteristics, e.g., physical characteristics which are within a predetermined range of physical characteristics, second directional gate 111*b* is positioned in a first position and first directional gate 11*a* may direct the received items into first holding chamber 114*a*. The container then may move to a position which is substantially, vertically aligned with first holding chamber 114*a*, and accept door 115*a* then may move from a closed positioned to an open position, such that the items received by first holding chamber 114*a* are directed toward bulk delivery apparatus 106 and into the container. When first directional gate 111*a* directs the received items into first holding chamber 114*a*, first directional gate 11*a* may receive new items, such that the new items may be positioned within first chamber 112 or second chamber 113.

Nevertheless, if first directional gate 111*a* receives any item which does not have acceptable characteristics, e.g., physical characteristics which are greater than or less than the predetermined range of physical characteristics, second directional gate 111*b* may move from the first position to a second position, and first directional gate 111*a* subsequently may direct the received items into second holding chamber 114*b*. When first directional gate 114*a* directs the received items into second holding chamber 114*b*, first directional gate 111*a* may receive new items, such that the new items may be positioned within first chamber 112 or second chamber 113. Moreover, dispensing head 109 may orbit around bulk delivery apparatus 106, and the means for releasing may further comprise means for altering an angle of roller 1210, such that when the angle of roller 1210 is altered, recirculate door 116*a* opens. For example, the means for altering the angle of roller 1210 may comprise a raised portion (not shown). When roller 1210 contacts the raised portion, roller 1210 may move in an upward direction, and recirculate door 116*a* automatically opens, such that the items in second holding chamber 114*b* are directed away from bulk delivery apparatus 106 and onto a conveyer (not shown). The second strainer then separates the items on the conveyer having a diameter less than the second predetermined diameter from the items on the conveyer having a diameter greater than or equal to the second predetermined diameter. Moreover, the items on the conveyer having a diameter greater than or equal to the second predetermined diameter are delivered to bulk delivery apparatus 106. Consequently, when a batch of items is unacceptable because one of the items in the batch does not have acceptable characteristics, those items in the batch which have acceptable characteristics may be redelivered to dispensing head 109 via bulk delivery apparatus 106; such that the number of acceptable items which dispensing system 100 disposes of may be reduced. Moreover, because the items which are not dispensed into containers are directed away from bulk delivery apparatus 106, these items may not adversely affect the components of dispensing system 100. For example, the food items may not contact or adhere to the components of dispensing system 100. Further, because the items which are not dispensed into containers are directed away from bulk delivery apparatus 106, the need to clean dispensing system 100 may occur less frequently, and dispensing system 100 more easily may be cleaned.

Referring again to FIG. 1, in another embodiment of the present invention, holding chamber 114 may include two pairs of doors for directing items to a container or for diverting items away from a container. Based on a measurement and count of each dispensed item by sensing units 108, each dispensing head 109 may be activated to direct predetermined quantities of items, the measured physical characteristic of each of which items is within a predetermined range of physical characteristics, to a container or the like.

Moreover, based on measured values of each dispensed item, dispensing heads 109 may direct predetermined volumes, weights, or the like, to a container. Dispensing heads 109 may be activated to divert dispensed items, the measured physical characteristic of which is greater than or less than a predetermined range of physical characteristics away from a container or the like.

Figure 8:
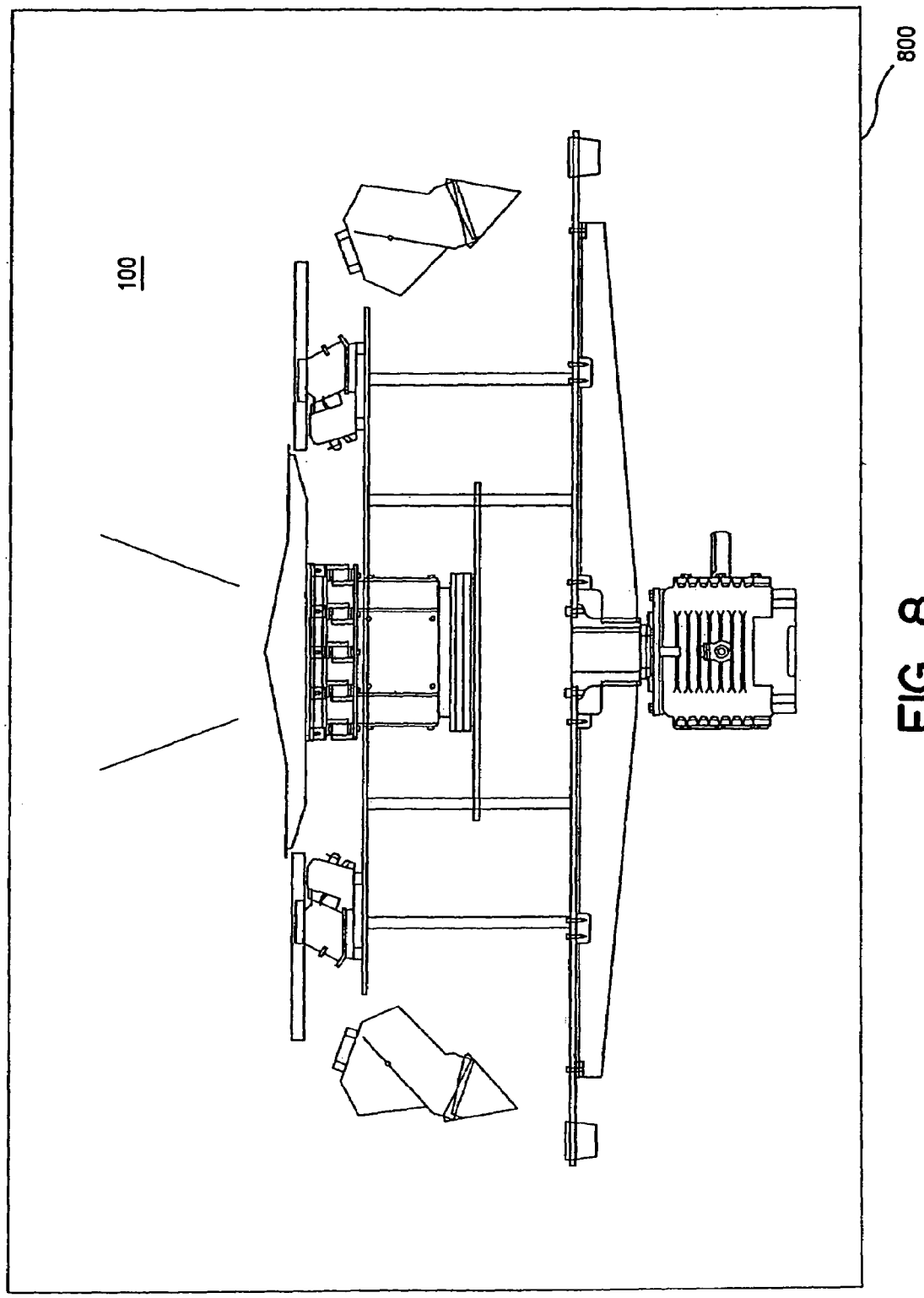
FIG. 8 shows a refrigeration unit for use with the rotary, vibratory dispenser of the present invention.

In a further embodiment of the present invention, rotary, vibratory dispenser 100 may include a refrigeration unit for maintaining items, e.g., perishable food items or the like, at a predetermined temperature. Refrigeration unit may provide cooled air to rotary, vibratory dispenser 100, so that items may be maintained at a predetermined temperature of about −3° C. (25° F.) to about 7° C. (45° F.) during operation of rotary, vibratory dispenser 100, or bulk delivery apparatus 106, or both. For example, refrigeration unit may maintain frozen food items at a temperature of about −2° C. (27° F.). Refrigeration unit may maintain thawed food items at a temperature of about 4° C. (40° F.). Refrigeration unit may provide cooled air to rotary, vibratory dispenser 100, or bulk delivery apparatus 106, or both. For example, refrigeration unit 800 may enclose rotary, vibratory dispenser 100, or bulk delivery apparatus 106, or both, as shown in FIG. 8. Refrigeration unit may store items to be dispensed before the items are transferred to bulk delivery apparatus 106.

Figure 5:
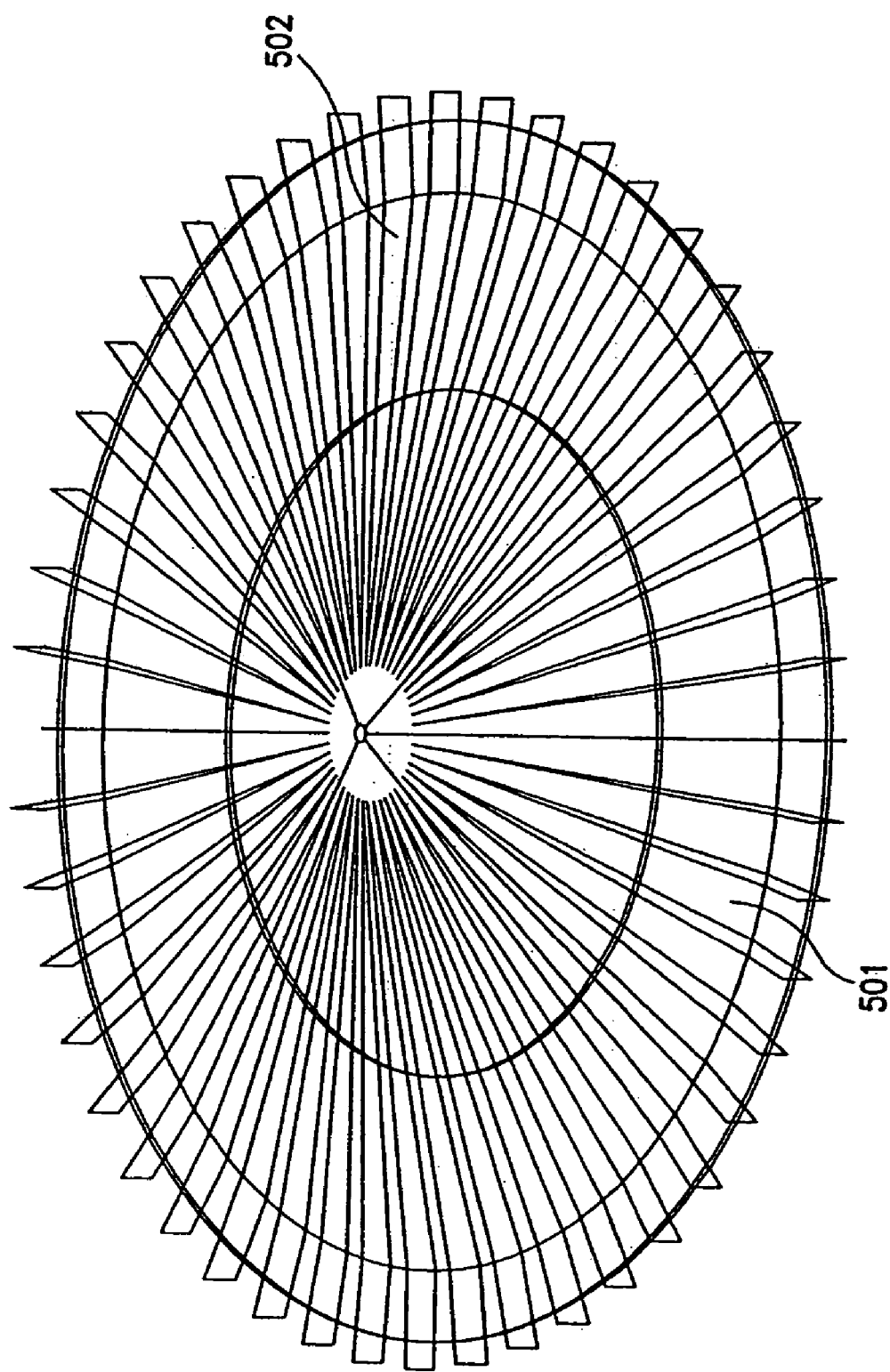
FIG. 5 shows a partially cutaway plan view of a dispenser according to another embodiment of the present invention.
Figure 6:
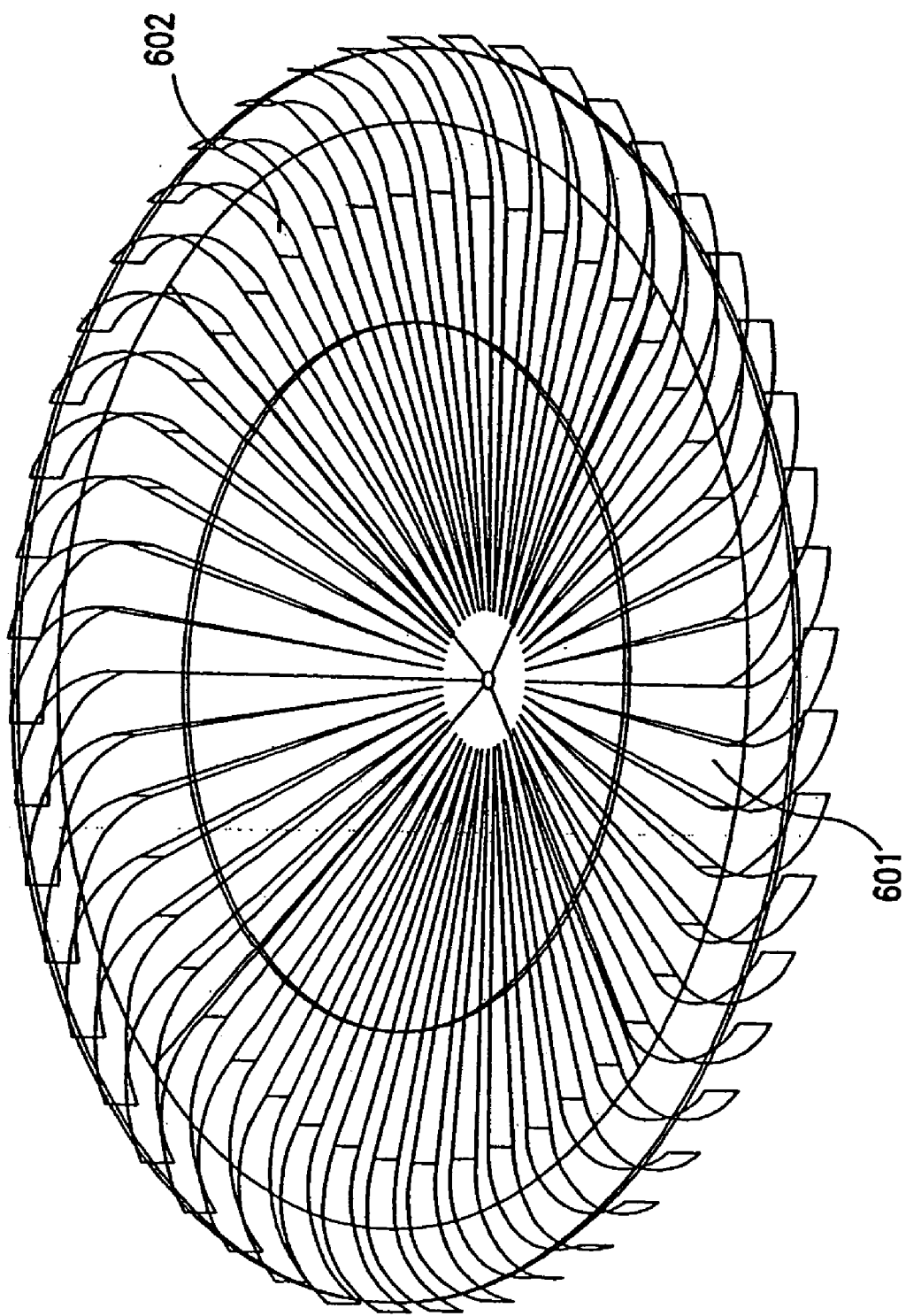
FIG. 6 shows a partially cutaway plan view of a dispenser according to another embodiment of the present invention.

According to another embodiment of the invention, item-receiving surface 101b of feeder bowl 101 may include a plurality of lane dividers, which form a plurality of lanes for guiding items along item-receiving surface 10b of feeder bowl 101 to dispensing paths 102 positioned around feeder bowl 101. Each lane divider 502 may be positioned substantially perpendicular to item-receiving surface 101b of feeder bowl 101 and may extend radially from a center, e.g., a geometric center, of feeder bowl 501, toward a periphery of feeder bowl 501, as shown in FIG. 5. According to another aspect of this embodiment of the invention, each lane may extend in an arc-shaped fashion from a center, e.g., a geometric center, of feeder bowl (not shown). According to a further aspect of this embodiment of the invention, each lane divider 602 may extend in a partially radial and a partially arc-shaped manner from a center, e.g., a geometric center, of feeder bowl 601, as shown in FIG. 6. Moreover, each of the lanes formed between a pair of adjacent lane dividers 502, 602 may correspond to one or more dispensing paths or channels positioned around feeder bowl 501, 601. In a further embodiment, two or more lanes 502, 602 may correspond to a single dispensing path or channel.

Figure 10:
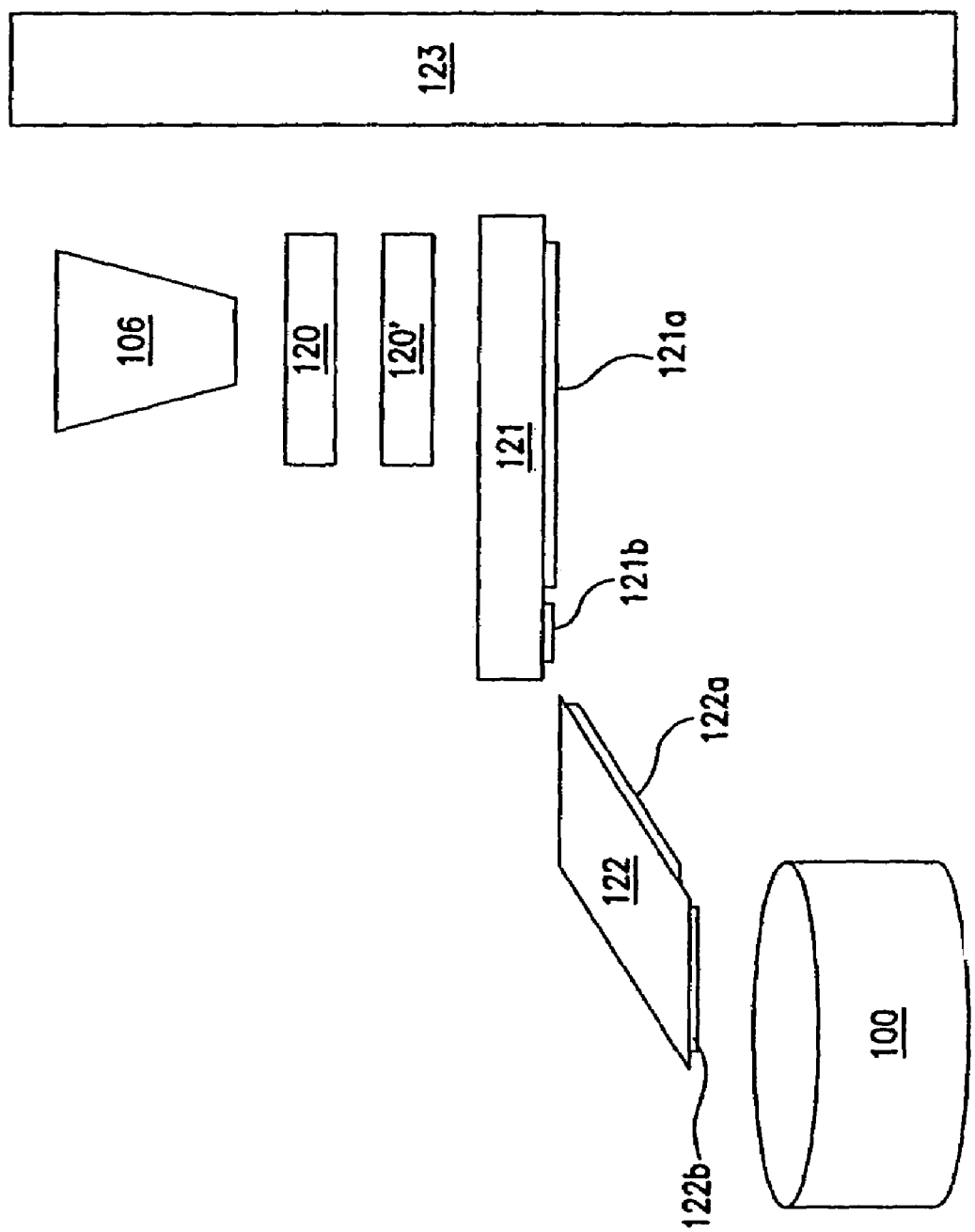
FIG. 10 shows a bulk delivery system according to an embodiment of the invention.

According to another embodiment of the invention shown in FIG. 10, a bulk delivery system may comprise bulk delivery apparatus 106 and one or more components that improve the ability of bulk delivery apparatus 106 to deliver items uniformly to feeder bowl 101. For example, the bulk delivery system may comprise bulk delivery apparatus 106 for delivering a plurality of items, one or more screens 120, 120' for separating items, a vibratory lane 121, and a vibratory chute 122 for delivering items to feeder bowl 101. Each screen 120, 120' may comprise openings of different dimension depending upon the physical characteristic of items to be dispensed.

Vibratory lane 121 may comprise a vibratory lane drive 121a and a vibratory lane sensing unit 121b. Vibratory lane sensing unit 121b may comprise a load cell for weighing items received by vibratory lane 121, so that a weight of items received and delivered by vibratory lane 121 per unit of time, e.g., per minute, may be measured. Moreover, vibratory chute 122 may comprise a vibratory chute drive 122a and a vibratory chute sensing unit 122b. Vibratory chute sensing unit 122b may comprise a load cell for weighing items received by vibratory lane, so that a weight of items received by vibratory chute 122 per unit of time, e.g., per minute, may be measured. Vibratory lane drive 121a and vibratory chute drive 122a may comprise Syntron® Solid Mount Linear Drives, which are available from FMC Technologies Material Handling Solutions of Homer City, Pa. Vibratory chute 122 may comprise a grated bottom, e.g., a bottom with a plurality of openings.

A lift 123 may load items into bulk delivery apparatus 106. For example, in one embodiment of the invention, a plurality of items, e.g., a dry pasta, may be loaded by lift 123 into bulk delivery apparatus in ranges of about 400 lb to about 1,000 lb.

In operation, rotary, vibratory dispenser 100 receives a plurality of items to be dispensed. Items to be dispensed may include dried pasta, prepared pasta, meat products, vegetables, and frozen, chilled, or thawed food products. Items may include non-food items, as well. A bulk delivery apparatus 106, e.g., a hopper, a conveyor, a chute, or the like, may deliver items to rotary, vibratory dispenser 100, e.g., to a feeder bowl 101 of rotary, vibratory dispenser 100. Bulk delivery apparatus 106 may deliver items to feeder bowl 101 at varying rates, e.g., at rates corresponding to a desired rate of dispensing items from each dispensing path 102 or channel 403.

Feeder bowl rotation drive 103 may rotate feeder bowl 101 at a desired rotational speed, e.g., at a rotational speed corresponding to a desired rate at which containers are to be filled by rotary, vibratory dispenser 100. Feeder bowl vibration device 104 may vibrate feeder bowl 101 proportionately to a physical characteristic, e.g., a weight, a volume, a density, or the like, of each item to be supplied by feeder bowl 101 to dispensing paths 102. Moreover, feeder bowl vibration device 104 may vibrate feeder bowl 101 proportionately to a rotational speed of feeder bowl 101 or a rate of delivery of items from bulk delivery apparatus 106 or a desired rate of supply of items from feeder bowl 101 to dispensing paths 102, so that feeder bowl 101 may supply items uniformly to each dispensing path 102 at a sufficient rate to enable each dispensing path 102 or channel 403 to dispense items singularly at a desired rate. Feeder bowl vibration device 104 may vibrate feeder bowl 101 at different vibrational magnitudes or different vibrational frequencies or both, in a first plane or a second plane, or both. First plane and second plane may be transverse, or first plane may be substantially vertical, while second plane may be substantially horizontal. Feeder bowl 101 may supply items uniformly to a plurality of dispensing paths 102 in a range of about twelve (12) dispensing paths to about one hundred (100) dispensing paths.

Dispensing paths 102 may rotate at a rotational speed that is substantially similar to a rotational speed of feeder bowl 101, or dispensing paths 102 may rotate at a rotational speed that is greater than or less than a rotational speed of feeder bowl 101. Dispensing path vibration devices 105 may vibrate each dispensing path 102 and its associated channel(s) proportionately to a physical characteristic, e.g., a weight, a volume, a density, or the like, of each item to be dispensed, so that each dispensing path 102 and its associated item-dispensing channel(s) dispenses items singularly. Dispensing path vibration device 105 may vibrate each channel at different vibrational magnitudes or different vibrational frequencies or both, in a first plane or a second plane, or both, where first plane and second plane are transverse. First plane may be substantially vertical, while second plane may be substantially horizontal. Moreover, dispensing path vibration devices 105 may vibrate each dispensing path and its associated item-dispensing channel(s) independently of every other dispensing path and associated item-dispensing channels and independently of a vibration of feeder bowl 101.

Sensing units 108 measure, or count each item dispensed from each channel of each dispensing path 102. For example, each sensing unit 108 may measure a physical characteristic, e.g., a weight, a volume, a density, or the like, of each item dispensed from each channel. Sensing units 108 may identify items the measured physical characteristic of which is greater than or less than a predetermined range of physical characteristics. If any of the measurements indicates that the items are not being dispensed singularly from a dispensing path, the respective dispensing path vibration device 105 may be adjusted, so that the dispensing path 102 may dispense items singularly. Moreover, a rotational speed of feeder bowl 101, dispensing paths 102, or both may be adjusted, so that dispensing paths dispensing items singularly.

Dispensing head 109 may be positioned at each dispensing path 102, e.g., at each channel of each dispensing path 102, to receive items dispensed therefrom. Doors 115, 116 of holding chamber 114 of dispensing head 109 may direct predetermined quantities or volumes of items to a container or divert items away from a container, depending upon the measured value of each item received by each dispensing head 109. Similarly, door 115' of holding chamber 114', and doors 116', and 116" of holding chamber 114" may direct predetermined quantities or volumes of items to a container or divert items away from a container, depending upon the measured value of each item received by each dispensing head 109. Dispensing head 109 may divert items the measured physical characteristic of which is greater than or less than a predetermined range of physical characteristics away from a container. Dispensing head 109 may direct predetermined quantities of items, the measured physical characteristic of which is within a predetermined range of physical characteristics to a container. Dispensing head 109 may direct predetermined quantities of one to fifty items to each container.

According to another embodiment of the invention, a refrigeration unit may provide cooled air to rotary, vibratory dispenser 100, or bulk delivery apparatus 106, or both, so that items may be maintained at a temperature of about −3° C. (25° F.) to about 7° C. (45° F.) during operation of rotary, vibratory dispenser 100, or bulk delivery apparatus 106, or both. For example, refrigerated air may be supplied to rotary, vibratory dispenser to maintain frozen food items at a temperature of about −2° C. (27° F.) and thawed food items at a temperature of about 4° C. (40° F.).

Thus, the rotary, vibratory dispenser 100 of the present invention provides a number of advantages over known dispensers. The variable rotational and vibrational settings of feeder bowl 101 and the variable vibrational and rotational settings of dispensing paths 102 improves the ability of rotary, vibratory dispenser 100 to receive and dispense items at greater rates than known dispensers. Moreover, selective rotation and vibration of feeder bowl 101 and selective rotation and vibration of dispensing paths 102 enables rotary, vibratory dispenser 100 of the present invention to dispense items singularly from each channel of each dispensing path 102, so that sensing units 108 may obtain an accurate measurement or count, or both, of the dispensed items. Sensing units 108 and dispensing heads 109 enable rotary, vibratory dispenser 100 to dispense predetermined quantities of items, each of which items has a measured value, e.g., a volume, a weight, or the like, within a predetermined range of acceptable measurements.

Figure 12:
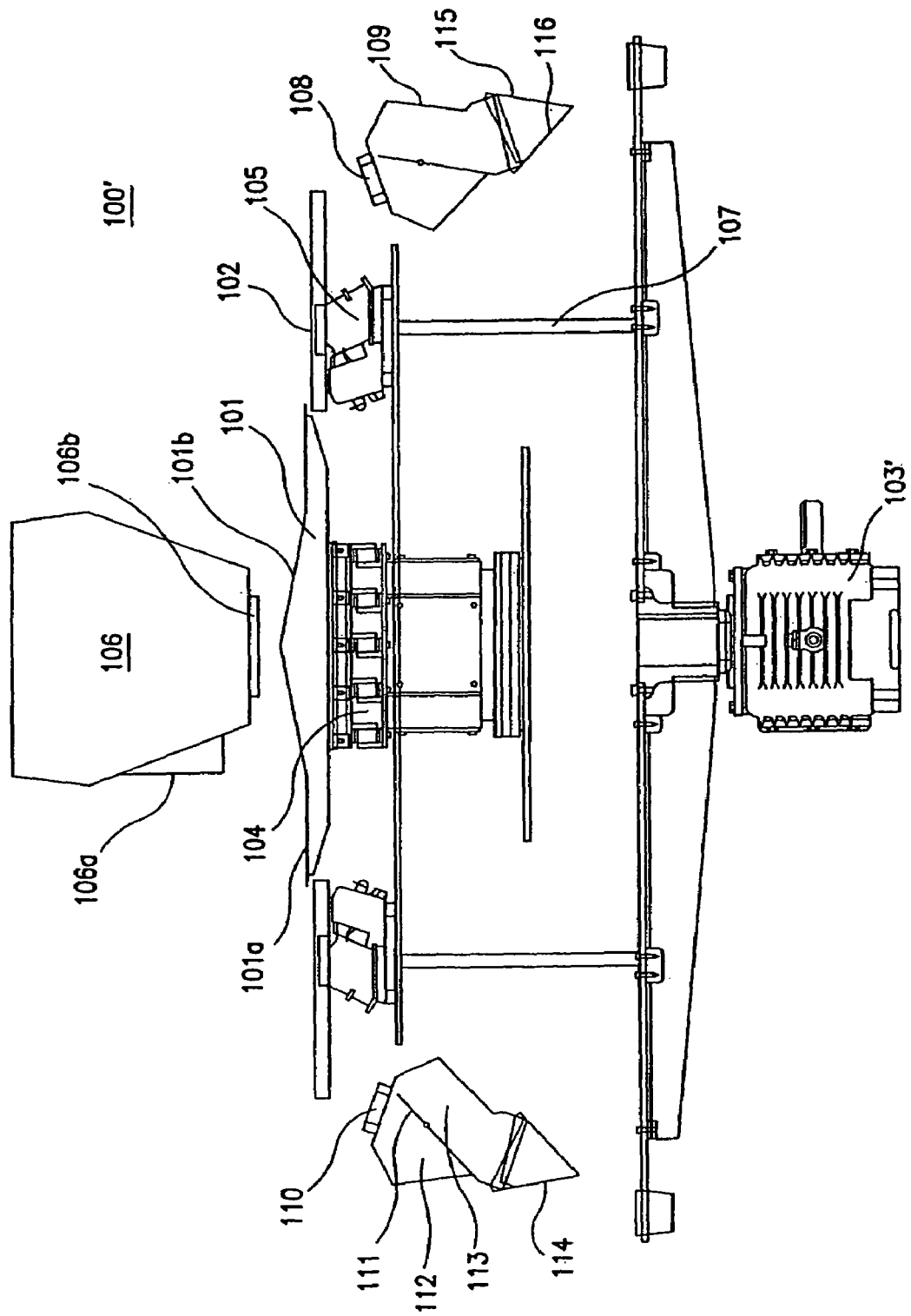
FIG. 12 shows a cross-sectional view of a dispenser according to another embodiment of the present invention.

Referring to FIG. 12, a dispenser 100' according to another embodiment of the present invention is depicted. The features and advantages of dispenser 100' are substantially similar to the features and advantages of dispenser 100. Therefore, the similar features and advantages of dispenser 100 and dispenser 100' are not discussed further with respect to dispenser 100'. Dispenser 100' may comprise feeder bowl 101, dispensing paths 102 positioned around feeder bowl 101, a dispensing path rotation drive 103' for rotating dispensing paths 102, feeder bowl vibration device 104, and the one or more dispensing path vibration devices 105 for vibrating each dispensing path 102. In this embodiment of the present invention, feeder bowl vibration device 104 may vibrate feeder bowl 101, the one or more dispensing path vibration devices 105 may vibrate dispensing paths 102, and dispensing path rotation drive 103' may rotate dispensing paths 102 around feeder bowl 101. For example, an edge of dispensing paths 102 may be positioned below and may overlap a portion of feeder bowl 101, such that at least one vertical plane includes both dispensing paths 102 and feeder bowl 101. Moreover, in this embodiment of the present invention, feeder bowl 101 does not rotate. Consequently, a lighter motor may be used, there are fewer moving parts is dispenser 100', and dispenser 100' may have increased control.

While the invention has been described in connection with preferred embodiments, it will be understood by those of ordinary skill in the art that other variations and modifications of the preferred embodiments described above may be made without departing from the scope of the invention. Moreover, other embodiments of the present invention will be apparent to those of ordinary skill in the art from a consideration of the specification or a practice of the invention disclosed herein, or both.

What is claimed is:

1. A dispensing system comprising:
 a dispenser, wherein the dispenser comprises:
  a feeder bowl for receiving items;
  a first vibration device for vibrating the feeder bowl;
  one or more dispensing paths positioned around the feeder bowl; and
  a rotation drive for rotating the one or more dispensing paths, wherein the one or more dispensing paths comprise at least one second vibration device for vibrating the one or more dispensing paths proportionately to at least one physical characteristic of the items; and
 one or more dispensing heads, wherein each of the one or more dispensing heads receives items from at least one of the one or more dispensing paths and comprises:
  a dispensing chute for directing a first plurality of the received items toward the dispenser, wherein the at least one physical characteristic of each of the first plurality of the received items is within a predetermined range of physical characteristics; and
  a diversion chute for directing a second plurality of the received items away from the dispenser.

2. The dispensing system of claim 1, wherein each of the one or more dispensing paths receive the items directly from the feeder bowl.

3. The dispensing system of claim 1, wherein each of the one or more dispensing paths comprises at least one channel for dispensing items singularly.

4. The dispensing system of claim 3, wherein a width and a depth of each of the channels increases as the channels extend from the feeder bowl.

5. The dispensing system of claim 1, wherein the at least one second vibration device comprises a plurality of second vibration devices, each of which second vibration devices vibrates a respective dispensing path to dispense the items singularly.

6. The dispensing system of claim 5, wherein each of the plurality of second vibration devices vibrates each of the dispensing paths in two intersecting planes.

7. The dispensing system of claim 1, wherein the at least one physical characteristic is selected from the group consisting of a density of each of the items, a volume of each of the items, and a weight of each of the items.

8. The dispensing system of claim 1, wherein the at least one second vibration device vibrates each of the dispensing paths in at two planes, the at least two planes being transverse to one another.

9. The dispensing system of claim 1, further comprising one or more sensing units, wherein each of the one or more sensing units measures the at least one physical characteristic of at least a portion of the items dispensed from at least one of the one or more dispensing paths.

10. The system of claim 1, wherein the at least one physical characteristic of at least one of the second plurality of the received items is greater than or less than the predetermined range of physical characteristics.

11. The dispensing system of claim 10, wherein each of the dispensing heads further comprises at least one holding chamber, wherein the at least one holding chamber directs the first plurality of the received items to the dispensing chute, and directs each of the second plurality of the received items to the diversion chute.

12. The dispensing system of claim 10, further comprising means for releasing the second plurality of the received items from the one or more dispensing heads.

13. The dispensing system of claim 12, further comprising:
a feeder bowl for receiving the items and for supplying the items to the one or more dispensing paths; and
means for separating the second plurality of the received items released from the dispensing head, which have the at least one physical characteristic within the predetermined range of physical characteristics, from the second plurality of the received items released from the dispensing head, which have the at least one physical characteristic greater than or less than the predetermined range of physical characteristics.

14. The dispensing system of claim 13, further comprising means for delivering the second plurality of the received items released from the dispensing head, which have the at least one physical characteristic within the predetermined range of physical characteristics to the feeder bowl.

15. The system of claim 14, wherein the means for separating comprises at least one strainer.

16. The system of claim 14, wherein the means for delivering comprises a conveyer.

* * * * *